(12) United States Patent
Thomas

(10) Patent No.: US 8,950,105 B2
(45) Date of Patent: Feb. 10, 2015

(54) BAIT MIMICKING INSERTABLE FISHING LURE MODULE

(71) Applicant: Kenneth Dale Thomas, Emory, TX (US)

(72) Inventor: Kenneth Dale Thomas, Emory, TX (US)

( * ) Notice: Subject to any disclaimer, the term of this patent is extended or adjusted under 35 U.S.C. 154(b) by 0 days.

(21) Appl. No.: 14/148,495

(22) Filed: Jan. 6, 2014

(65) Prior Publication Data

US 2014/0115944 A1      May 1, 2014

Related U.S. Application Data

(63) Continuation-in-part of application No. 13/649,197, filed on Oct. 11, 2012, now Pat. No. 8,621,776, which is a continuation-in-part of application No. 13/239,284, filed on Sep. 21, 2011, now Pat. No. 8,312,669.

(51) Int. Cl.
     *A01K 85/01*      (2006.01)

(52) U.S. Cl.
     CPC ........................................ *A01K 85/01* (2013.01)
     USPC .............................. 43/26.2; 43/42.31; 43/17.1

(58) Field of Classification Search
     USPC ....................... 43/26.2, 42.31, 26.1, 42.3, 17.1
     See application file for complete search history.

(56) References Cited

U.S. PATENT DOCUMENTS

| | | | | |
|---|---|---|---|---|
| 638,885 | A * | 12/1899 | Peterson et al. | 43/26.2 |
| 726,021 | A * | 4/1903 | Bryan | 43/26.2 |
| 891,037 | A * | 6/1908 | Caldwell | 43/26.2 |
| 941,911 | A * | 11/1909 | Burthe | 43/42.02 |
| 966,068 | A * | 8/1910 | Williamson | 43/26.2 |
| 1,801,579 | A * | 4/1931 | Sunday | 43/26.2 |
| 1,857,312 | A * | 5/1932 | Kuehn | 43/42.02 |
| 1,906,791 | A * | 5/1933 | Grossmann | 43/26.2 |
| 1,928,418 | A * | 9/1933 | Garland | 446/158 |
| 2,065,337 | A * | 12/1936 | Lee | 43/26.2 |
| 2,472,505 | A * | 6/1949 | Yocam et al. | 43/26.2 |
| 2,478,655 | A * | 8/1949 | Davis | 43/26.2 |
| 2,511,154 | A * | 6/1950 | Garland | 43/26.2 |
| 2,534,639 | A * | 12/1950 | Twist | 43/26.2 |
| 2,555,802 | A * | 6/1951 | Martin | 43/26.2 |
| 2,559,475 | A * | 7/1951 | Sparkman | 43/26.2 |
| 2,724,205 | A * | 11/1955 | Howard | 43/26.2 |
| 2,788,603 | A * | 4/1957 | Lindemann | 43/26.2 |
| 2,867,933 | A * | 1/1959 | Stookey | 43/42.02 |
| 2,891,343 | A * | 6/1959 | Palermo | 43/26.2 |
| 2,909,868 | A * | 10/1959 | Lewis | 43/26.2 |
| 3,065,564 | A * | 11/1962 | Dawes | 43/26.2 |
| 3,085,361 | A * | 4/1963 | Rhodes | 43/26.2 |
| 3,105,317 | A * | 10/1963 | Fox | 43/26.2 |

(Continued)

FOREIGN PATENT DOCUMENTS

| | | | | |
|---|---|---|---|---|
| DE | 19512031 A1 * | 10/1996 | ............ | A01K 85/01 |
| EP | 1741335 A1 * | 1/2007 | ............ | A01K 85/01 |

(Continued)

*Primary Examiner* — Darren W Ark
(74) *Attorney, Agent, or Firm* — Schultz & Associates, P.C.

(57) ABSTRACT

An electronic circuit in a fishing lure in the water is activated to broadcast a pre-recorded actual or simulated sound of a bait creature and or create lifelike bait creature motion. A switch in the lure activates a sound chip and a micro speaker, a water sensing automatic on-off switch turns the power on and off, and the battery is charged by an external charging coil. An alternate embodiment automatically activates the fishing lure device to replicate bait animals in size, shape, movement and sound.

6 Claims, 21 Drawing Sheets

(56) References Cited

U.S. PATENT DOCUMENTS

| | | | | |
|---|---|---|---|---|
| 3,120,073 A * | 2/1964 | Brunton | ............................ | 43/17.1 |
| 3,235,999 A * | 2/1966 | Wieszeck | ...................... | 43/17.1 |
| 3,457,667 A * | 7/1969 | Tripp | ............................. | 43/26.2 |
| 3,465,464 A * | 9/1969 | De Berry | ........................ | 43/26.2 |
| 3,466,784 A * | 9/1969 | Bonner | ............................ | 43/26.1 |
| 3,505,753 A * | 4/1970 | Henderson | ................... | 43/26.2 |
| 3,791,064 A * | 2/1974 | Van Iseghem, Jr. | ............ | 43/26.2 |
| 3,808,734 A * | 5/1974 | Suzuki | ............................ | 446/158 |
| 3,841,012 A * | 10/1974 | Maled | ............................. | 43/26.2 |
| 4,038,773 A * | 8/1977 | Castelletti et al. | ............ | 43/26.2 |
| 4,133,135 A * | 1/1979 | Miles | ........................... | 43/42.13 |
| 4,177,597 A * | 12/1979 | Thomassin | .................... | 43/42.3 |
| 4,223,467 A * | 9/1980 | Hodges et al. | ................. | 43/42.13 |
| 4,380,132 A * | 4/1983 | Atkinson | ......................... | 43/26.2 |
| 4,468,879 A * | 9/1984 | Anson | ............................ | 43/42.06 |
| 4,581,841 A * | 4/1986 | Gish | ............................... | 43/26.2 |
| 4,594,806 A * | 6/1986 | Brown | ........................... | 43/42.18 |
| 4,669,213 A * | 6/1987 | LeRoy | ............................ | 43/17.6 |
| 4,676,020 A * | 6/1987 | Taylor et al. | ................... | 43/42.06 |
| 4,700,501 A * | 10/1987 | Bryan | ............................. | 43/26.1 |
| 4,765,084 A * | 8/1988 | Braden | ............................. | 43/34 |
| 4,805,339 A * | 2/1989 | Fuentes et al. | ................. | 43/17.1 |
| 4,831,767 A * | 5/1989 | Pearce | ............................. | 43/26.2 |
| 4,832,650 A * | 5/1989 | Tong | ............................... | 43/26.2 |
| 4,858,370 A * | 8/1989 | Ryder | ............................. | 43/43.13 |
| 4,884,359 A * | 12/1989 | Wray | ............................ | 43/42.19 |
| 4,922,647 A * | 5/1990 | Tompkins | .................... | 43/42.44 |
| 4,980,987 A * | 1/1991 | Ramsey, Sr. | .................. | 43/42.02 |
| 5,035,075 A * | 7/1991 | Pearce | ............................. | 43/26.2 |
| 5,077,929 A * | 1/1992 | Khan | ............................. | 43/26.1 |
| 5,086,581 A * | 2/1992 | Barra et al. | ................... | 43/26.1 |
| 5,088,227 A * | 2/1992 | Toner et al. | .................... | 43/42.3 |
| 5,105,573 A * | 4/1992 | Mays | ............................ | 43/17.1 |
| 5,111,609 A * | 5/1992 | Flo | .................................. | 43/26.1 |
| 5,165,193 A * | 11/1992 | Dankwardt | .................... | 43/26.1 |
| 5,172,510 A * | 12/1992 | Lovell, Jr. | ..................... | 43/42.36 |
| 5,203,103 A * | 4/1993 | Hawley | ......................... | 43/17.1 |
| 5,203,559 A * | 4/1993 | Goldfarb | ........................ | 473/54 |
| 5,309,664 A * | 5/1994 | Wright | ............................ | 43/26.1 |
| 5,321,905 A * | 6/1994 | Higgins | ........................ | 43/42.03 |
| 5,331,760 A * | 7/1994 | DuMont | ........................ | 43/17.1 |
| 5,344,357 A * | 9/1994 | Lyczek | ............................ | 446/154 |
| 5,485,697 A * | 1/1996 | Watson et al. | ................. | 43/17.1 |
| 5,535,538 A * | 7/1996 | Heuke | ............................. | 43/26.1 |
| 5,694,714 A * | 12/1997 | Basso et al. | ................... | 43/26.2 |
| 5,697,182 A * | 12/1997 | Rodgers | ......................... | 43/17.1 |
| 5,775,022 A * | 7/1998 | Sumrall et al. | ...................... | 43/3 |
| 5,875,582 A * | 3/1999 | Ratzlaff et al. | ................ | 43/26.1 |
| 5,894,692 A * | 4/1999 | Firmin | ........................... | 43/42.02 |
| 5,924,236 A * | 7/1999 | Preston | .......................... | 43/42.31 |
| 5,931,715 A * | 8/1999 | Chang | ............................. | 446/158 |
| 6,000,165 A * | 12/1999 | Van Iseghem, Jr. | ............ | 43/26.2 |
| 6,035,574 A * | 3/2000 | Ware | ............................ | 43/42.31 |
| 6,050,022 A * | 4/2000 | Brick | ............................. | 43/26.2 |
| 6,058,644 A * | 5/2000 | Irwin et al. | .................... | 43/26.2 |
| 6,108,962 A * | 8/2000 | Barron | .......................... | 43/42.31 |
| 6,189,256 B1 * | 2/2001 | Boys | ............................. | 43/26.2 |
| 6,192,617 B1 * | 2/2001 | Lyles | ............................ | 43/17.1 |
| 6,195,930 B1 * | 3/2001 | Sato | ............................... | 43/42.3 |
| 6,305,120 B1 * | 10/2001 | Boys | ............................. | 43/26.2 |
| 6,389,732 B1 * | 5/2002 | Daniel | ........................... | 43/26.1 |
| 6,389,735 B1 * | 5/2002 | Holt | ............................... | 43/17.1 |
| 6,449,895 B1 * | 9/2002 | Zabihi | .............................. | 43/4 |
| 6,516,227 B1 * | 2/2003 | Meadows et al. | ............... | 607/46 |
| 6,553,263 B1 * | 4/2003 | Meadows et al. | ............... | 607/61 |
| 6,581,319 B2 * | 6/2003 | West | ............................. | 43/26.2 |
| 6,622,419 B2 * | 9/2003 | Pearce | ........................... | 43/26.2 |
| 6,631,581 B2 * | 10/2003 | Gomes et al. | ................... | 43/26.2 |
| 6,647,659 B1 * | 11/2003 | King et al. | ..................... | 43/17.6 |
| 6,684,556 B1 * | 2/2004 | Arbuckle et al. | .............. | 43/17.1 |
| 6,760,995 B2 * | 7/2004 | Mueller | ......................... | 43/26.2 |
| 6,779,291 B2 * | 8/2004 | Arcand | .......................... | 43/17.1 |
| 6,789,347 B1 * | 9/2004 | West et al. | ..................... | 43/17.1 |
| 6,804,909 B1 * | 10/2004 | West | ............................... | 43/17.1 |
| 6,807,766 B1 * | 10/2004 | Hughes et al. | ................. | 43/17.1 |
| 6,820,366 B1 * | 11/2004 | McDermott | .................... | 43/26.2 |
| 6,836,995 B1 * | 1/2005 | Zernov | ............................ | 43/26.1 |
| 6,880,287 B2 * | 4/2005 | Eubanks | ....................... | 43/42.13 |
| 6,895,280 B2 * | 5/2005 | Meadows et al. | ............... | 607/46 |
| 6,910,294 B1 * | 6/2005 | Talbert | .......................... | 43/26.2 |
| 6,920,714 B1 * | 7/2005 | Modglin | ........................ | 43/19.2 |
| 6,925,747 B1 * | 8/2005 | Swanson | ........................ | 43/26.2 |
| 7,055,280 B2 * | 6/2006 | Shen et al. | ..................... | 43/26.1 |
| 7,062,878 B1 * | 6/2006 | Williams, Jr. | .................. | 43/17.1 |
| 7,080,476 B2 * | 7/2006 | King | ............................. | 43/42.3 |
| 7,177,690 B2 * | 2/2007 | Woods et al. | ................... | 607/29 |
| 7,177,691 B2 * | 2/2007 | Meadows et al. | ............... | 607/36 |
| 7,207,135 B2 * | 4/2007 | Williams, Jr. | .................. | 43/17.1 |
| 7,310,905 B2 * | 12/2007 | Merline | ......................... | 43/26.2 |
| 7,383,659 B1 * | 6/2008 | Honkanen | ..................... | 43/26.2 |
| 8,312,669 B2 * | 11/2012 | Thomas | ........................ | 43/17.1 |
| 8,387,303 B2 * | 3/2013 | Abraham et al. | ............... | 43/26.2 |
| 2002/0014031 A1 * | 2/2002 | Brinkman | ..................... | 43/42.31 |
| 2002/0088165 A1 * | 7/2002 | Walencik | ...................... | 43/42.03 |
| 2002/0104250 A1 * | 8/2002 | West | ............................. | 43/17.1 |
| 2003/0154642 A1 * | 8/2003 | Johnston | ....................... | 43/42.33 |
| 2004/0200125 A1 * | 10/2004 | Albanito et al. | ............... | 43/42.36 |
| 2005/0138857 A1 * | 6/2005 | Markley et al. | ................ | 43/26.2 |
| 2005/0150151 A1 * | 7/2005 | Wiskur | ......................... | 43/42.31 |
| 2005/0178043 A1 * | 8/2005 | Markley et al. | ................ | 43/26.1 |
| 2006/0010763 A1 * | 1/2006 | Podlewski et al. | ........... | 43/42.31 |
| 2006/0117640 A1 * | 6/2006 | Castaneda | .................... | 43/17.1 |
| 2006/0140421 A1 * | 6/2006 | Swafford | ......................... | 43/4.5 |
| 2006/0191185 A1 * | 8/2006 | Hansen | .......................... | 43/27.4 |
| 2007/0293914 A1 * | 12/2007 | Woods et al. | ................... | 607/60 |
| 2008/0265088 A1 * | 10/2008 | Choi | ............................... | 244/55 |
| 2010/0293832 A1 * | 11/2010 | Woodcock | .................... | 43/26.2 |
| 2011/0061287 A1 * | 3/2011 | Ogawa | ........................... | 43/26.2 |

FOREIGN PATENT DOCUMENTS

| | | | | | |
|---|---|---|---|---|---|
| FR | | 2858180 A1 * | 2/2005 | ............. | A01K 85/01 |
| GB | | 2322530 A * | 9/1998 | ............. | A01K 85/01 |
| GB | | 2333431 A * | 7/1999 | ............. | A01K 85/01 |
| WO | WO | 9503691 A1 * | 2/1995 | ............. | A01K 85/01 |
| WO | WO | 2005084431 A1 * | 9/2005 | ............. | A01K 85/01 |
| WO | WO | 2007047020 A2 * | 4/2007 | ............. | A01K 85/01 |
| WO | WO | 2008151476 A1 * | 12/2008 | ............. | A01K 85/01 |

* cited by examiner

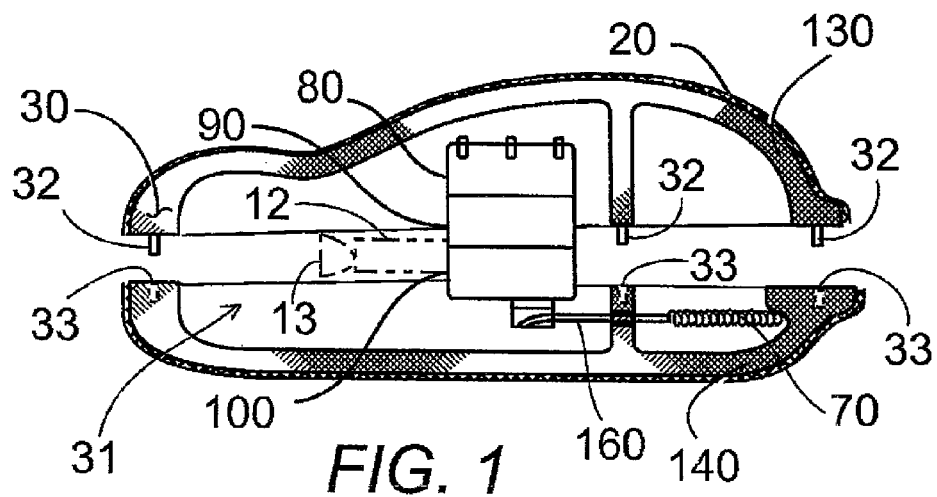

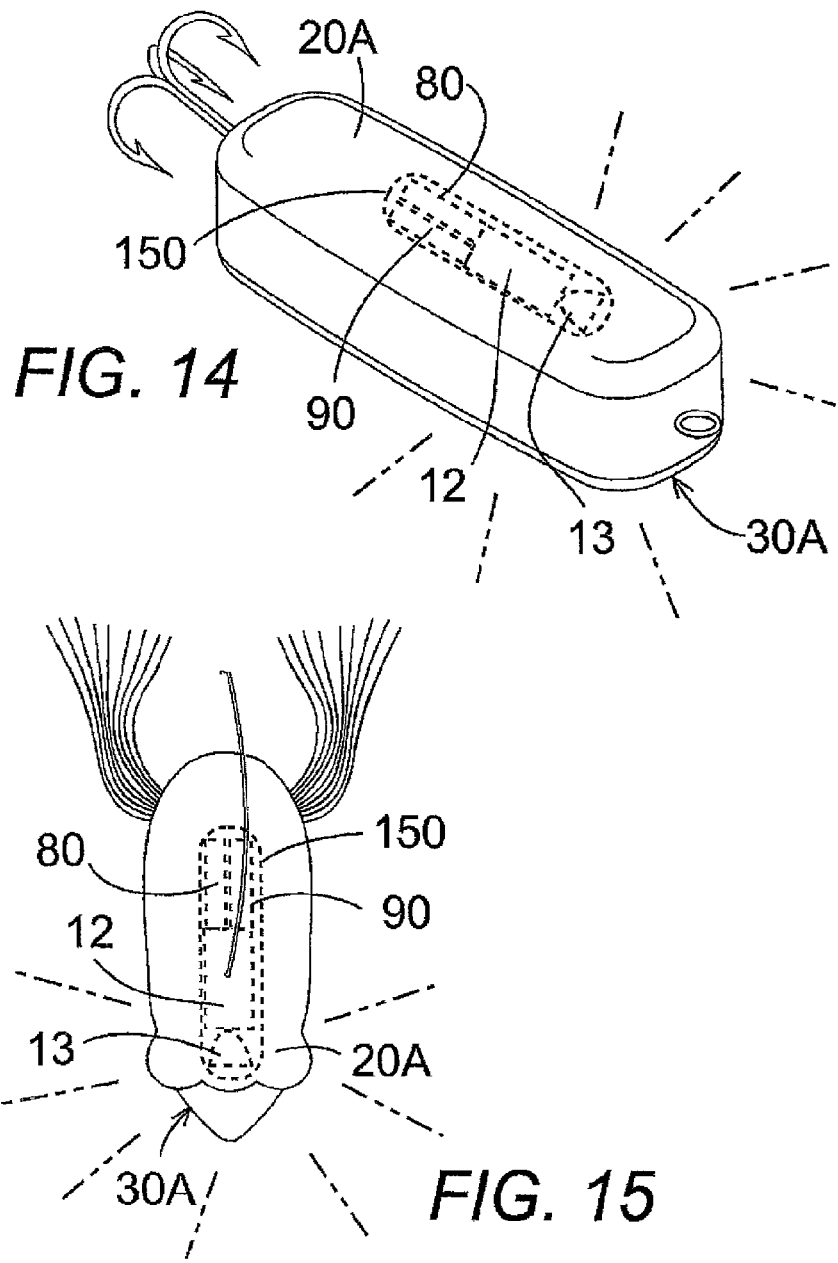

BAIT MIMICKING INSERTABLE FISHING LURE MODULE

CROSS-REFERENCE TO RELATED APPLICATIONS

This application is a Continuation-In-Part of U.S. patent application Ser. No. 13/649,197, filed Oct. 11, 2012, which is a Continuation-In-Part of U.S. patent application Ser. No. 13/239,284, filed Sep. 21, 2011, now U.S. Pat. No. 8,312,669.

FIELD OF THE INVENTION

The present invention relates to a fishing lure and in particular to a fishing lure device broadcasting actual or simulated recorded bait animal sounds from inside a body resembling the size, shape, and optionally the movement of the bait animal in the water.

BACKGROUND OF THE INVENTION

In order to be highly effective in catching fish, such as bass, it is necessary to replicate the bait animals, fish, and insects that they prefer for food as closely as possible including sound, shape, and motion.

Much of the prior art remote controlled fishing lures focus in one way or another on using discrete outdated technology such as a vibrating motor for vibration only and have no legs or tail. The fish lures of the prior art are often expensive to make and fragile. The fishing lure disclosed here utilizes modern surface mount technology to produce either or both audible bait sounds and lifelike motion in a robust, mechanically simple, and inexpensive design.

Related prior art patents and published patent applications include U.S. Pat. No. 6,684,556; U.S. Patent Publication No. 2005/0257418; U.S. Patent Publication No. 2004/0200125; U.S. Pat. Nos. 6,920,714; 7,055,280; 6,836,995; 6,804,909; 6,789,347; 6,910,294; U.S. Patent Publication No. 2002/0014031; U.S. Pat. Nos. 6,449,895; 6,581,319, 6,035,574; 5,894,692; 5,535,538; 5,321,905; 5,105,573; 4,922,647; 4,380,132; 3,841,012; 7,207,135; 7,080,476; U.S. Patent Publication No. 2005/0150151; U.S. Pat. No. 6,880,287; U.S. Patent Publication No. 2003/0115788; U.S. Pat. No. 6,779,291; U.S. Patent Publication No. 2003/0154642; U.S. Patent Publication No. 2002/0104250; U.S. Patent Publication No. 2002/0088165; U.S. Pat. Nos. 6,192,617; 5,172,510; 4,980,987; 4,884,359; 4,858,370; 4,700,501; 4,676,020; 4,581,841; 4,594,806; 4,468,879, 4,177,597; 4,133,135; 3,465,464; and 3,457,667.

What is needed is a fishing lure device which broadcasts the actual or simulated recorded bait creature sound and/or motion from a replicated bait creature body in the water either automatically or controlled by the fisherman.

SUMMARY OF INVENTION

An object of the present invention is to provide a fishing lure device containing a small insertable module which broadcasts the actual or simulated recorded bait creature sound and/or lifelike motion from a replicated bait creature body lure in the water. The sound is produced by a module inside the lure via a micro speaker communicating with a micro chip. The microchip having the recorded actual or simulated sound of the bait creature stored thereon. The sound is broadcast through the micro speaker and the lifelike motion is imparted to the lure body when activated automatically or by a motion sensing device activated by tugging on the fishing line attached to the lure.

An alternate object is to produce a fishing lure device containing an insertable module which broadcasts the actual or simulated recorded bait creature sound from a replicated bait creature body in the water, wherein the sound is produced by a remote radio controlled robotic fishing lure device replicating bait creatures in size, shape, and movement and transmitting actual or simulated recorded bait creature sounds, which utilizes a simple magnetic actuator and programmable sound device remotely controlled to activate simulated bait creature extremity movement and sounds.

The sound and/or motion generating module of the present invention provides a unique combination of resonant inductive charging using a battery protection circuit by inserting the lure with the module in the lure receptacle of the charger, and a water sensing switch for automatically turning the power on and off when the lure is in or out of the water, or a magnetic latch switch which enables turning the power on and off externally with a magnet on the shore or in the boat.

The micro-miniature surface mount technology of the preferred embodiment of the insertable module of the present invention does not use discrete components but utilizes surface mount technology making it robust and economical to produce about 1/10th the size of a discrete component module.

The module may either comprise a "slip-in" module inserted in various hollow body soft rubber shaped lures or may be built into hollow plastic shapes. Either type can be made to be either floating or sinking.

Another unique feature of the present invention is the baby alligator shape. There are no lures of this type on the market with this shape. This soft rubber hollow body lure replicates a baby alligator sound and/or shape with soft rubber extremities and may be made with activated sound and/or lifelike motion.

There are many lures that can use the technology of the present invention. For bass fishing, some of the basic types of hollow body soft plastic lures envisioned to use the sound modules of the present invention include a bassfrog, a frog form which makes a "ribbit" sound and has interchangeable legs; a basspop, a popper form which makes a "popping chugging" sound and has interchangeable legs; a bassgator, a hatchling gator form which makes a hatchling gator "squeeking" sound has both legs and a tail that swings side to side; a basscrayfish, a crayfish form which makes crayfish "clicking" sounds; a basschad, a shad form which makes shad "rattling buzzing" sounds; and a bassbream, a bream/sunperch form which makes a small fish sound and a wagging tail motion.

The components for reproducing the actual or simulated sound and motion of the bait creature are encapsulated in a waterproof module which is inserted in a hollow simulated bait creature body. The module is placed within a hollow soft rubber body of whichever shape you choose; frog, gator, crayfish, shad, popper or other bait creature. The lure body can therefore be changed very easily if and when it gets damaged. The insertable module reproduces the pre-recorded actual or simulated sound and/or motion of the bait animal.

In a solid body embodiment, the appendages may be removable so that a fisherman can change the legs when they get ripped without having to change the lure body and he can change the legs to the type and color he wishes as conditions change.

The insertable module is preferably encapsulated in a material that makes it buoyant or in the case of the crayfish non-buoyant, so the lures can either float or sink depending on the choice of lure type.

In an alternate embodiment, the components for reproducing the actual or simulated sound and motion of the bait creature are encapsulated in a lure body. The body includes a rechargeable battery or a non rechargeable battery.

Those skilled in the art will appreciate the above-mentioned features and advantages of the invention together with other important aspects thereof upon reading the detailed description that follows in conjunction with the drawings provided.

BRIEF DESCRIPTION OF THE DRAWINGS

In the detailed description of the preferred embodiments presented below, reference is made to the accompanying drawings.

FIG. 1 is a sectional side view of a first embodiment of the invention, illustrating a remote radio controlled artificial fishing lure with legs, to create a fishing lure in a shape that emulates a frog, baby alligator, mouse, rat, aquatic insect, or other chosen shape.

FIG. 2 is a bottom view of the first embodiment of the invention illustrating the various components of the fishing lure.

FIG. 14 is perspective top view of another embodiment device of the present invention illustrated as a rounded rectangular body with trailing hook showing the internal power source, receiver, and sound transmitter.

FIG. 15 is perspective top view of another embodiment device of the present invention illustrated as a large insect with tail-like streamers showing the internal power source, receiver, and sound transmitter.

DETAILED DESCRIPTION OF THE PREFERRED EMBODIMENT

In the description that follows, like parts are marked throughout the specification and figures with the same numerals, respectively. The figures are not necessarily drawn to scale and may be shown in exaggerated or generalized form in the interest of clarity and conciseness.

In FIGS. 1-29, bait sound producing microchip 12 and 314 and micro speaker 13 and 315 are shown in a waterproof bait creature sound and/or motion producing modules 150, 300, 300A, and 300B. The modules are insertable in fishing lure body 30, 30A, 30B and 30C. The modules include self contained electronics inside to broadcast sound reproductions of pre-recorded actual and simulated bait creature sounds appropriate to the shape of the lure when remotely activated by a fisherman, as well as means for creating appropriate motion in the lure. The modules and lure bodies can be used for fishing in both fresh and saltwater.

The modules may be applied either as a "slip-in" to various hollow body soft rubber shapes or built into hollow plastic shapes.

Figure 18:
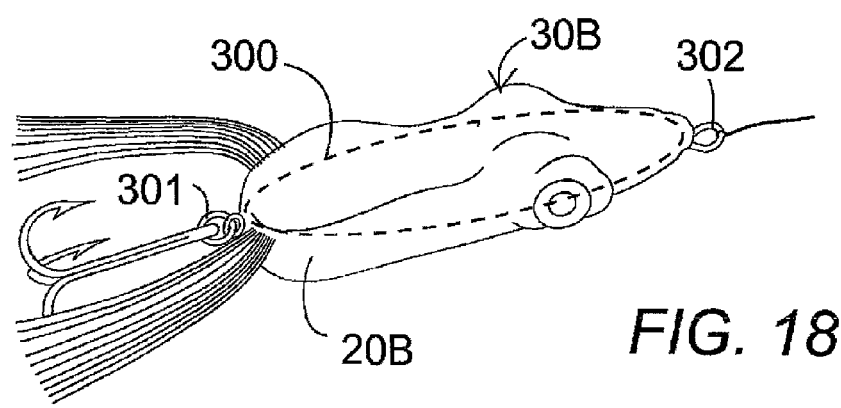
FIG. 18 is perspective top view of the bait sound producing fishing module housed inside a rubberized bait creature body simulating a baby frog or tadpole with tail-like streamers showing the bait creature body floating in water with the tail tilted downward.
Figure 19:
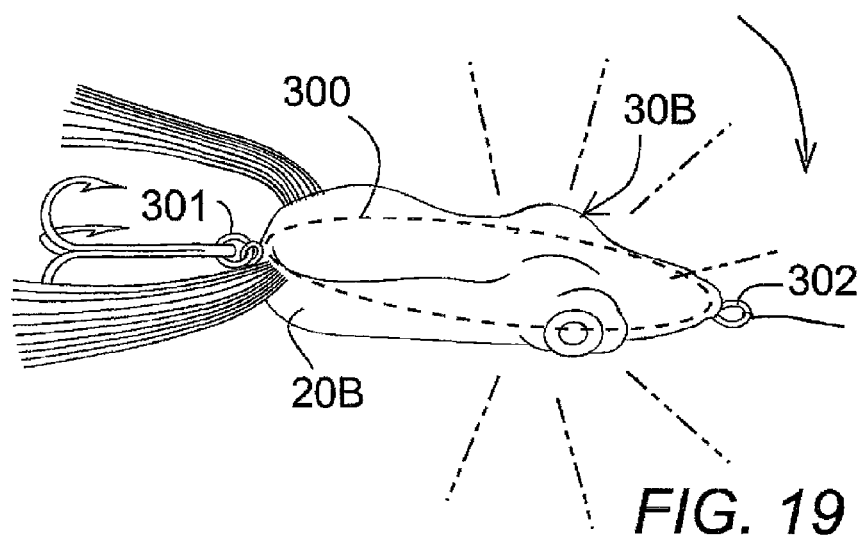
FIG. 19 is perspective top view of the bait sound producing fishing module housed inside the rubberized bait creature body of FIG. 18 showing the bait creature body floating in water with the head tilting downward caused by a tug on the fishing line thereby activating the broadcasting of the recorded bait creature sound from the fishing module.
Figure 20:
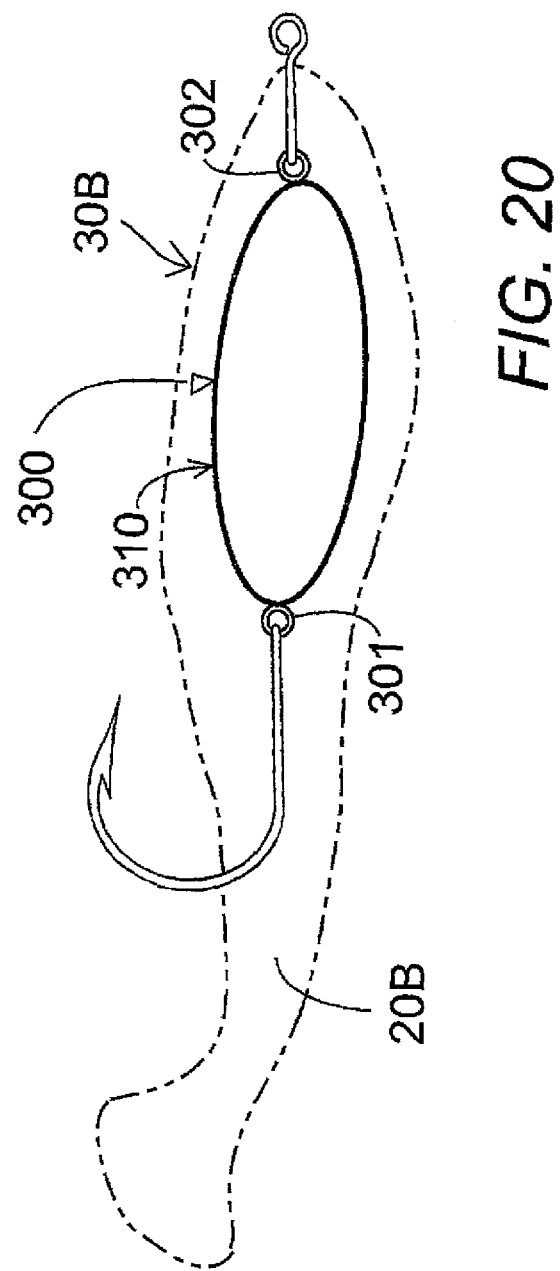
FIG. 20 is a side elevation view of a module fit within a soft rubber fishing lure (shown dashed) in the shape of a shad, having a hollow body cavity that the module slips into.
Figure 21:
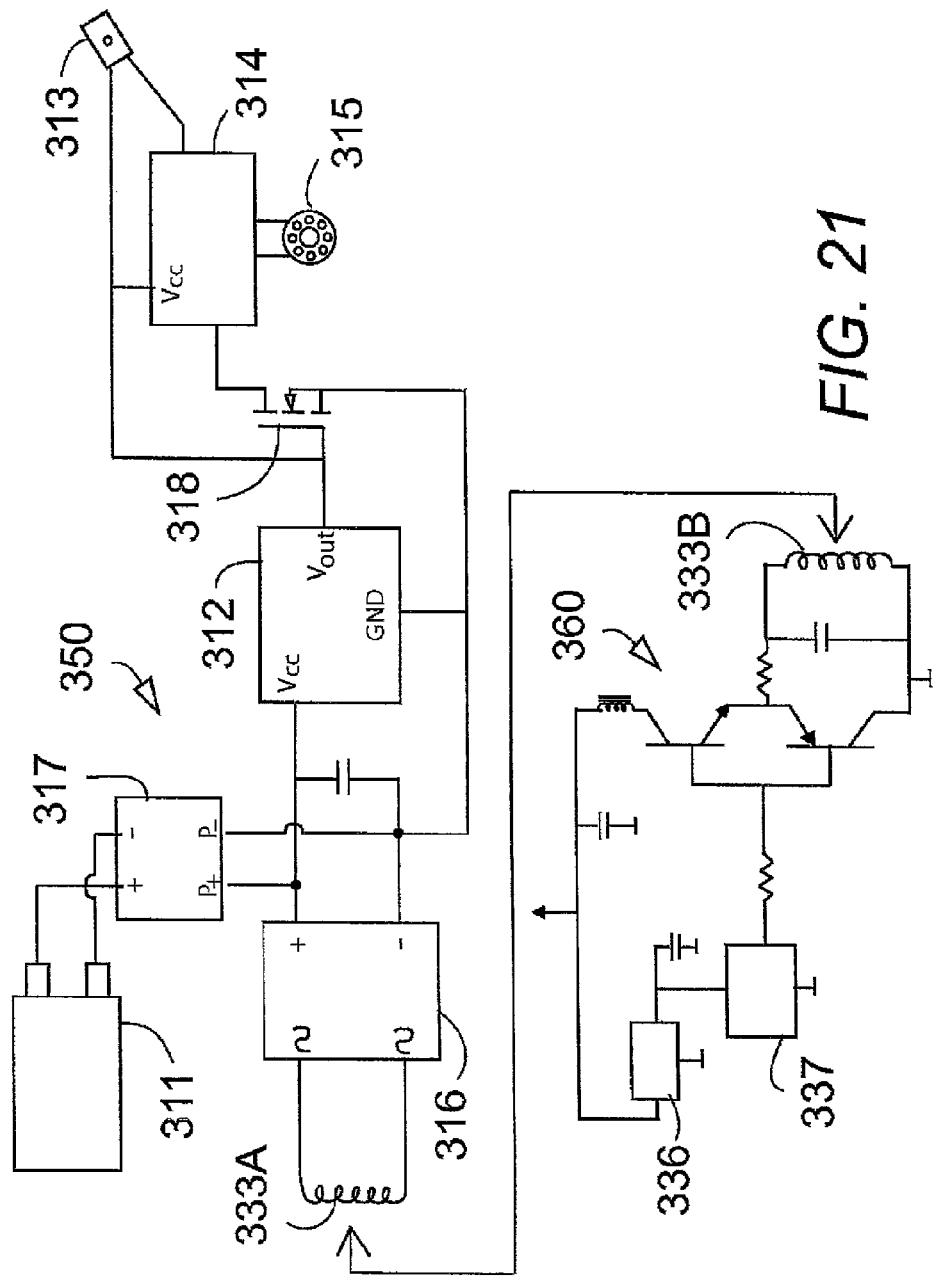
FIG. 21 is a schematic view of the preferred embodiment of the bait sound producing circuit and the charging circuit of the present invention, the sound producing circuit comprising an internal rechargeable battery powering the internal sound recording and playback chip and micro speaker for playing the pre-recorded actual or simulated sound of a bait creature for catching fish and a resonant inductive charging circuitry including an inductance pickup coil, a battery protection circuit and a magnetic latch switch all using micro-miniature surface mount technology, and the inductance coupled battery charger comprising a mating inductance coupling coil positioned so that the coils are in close proximity to charge the battery inside the module and the lure.
Figure 22:
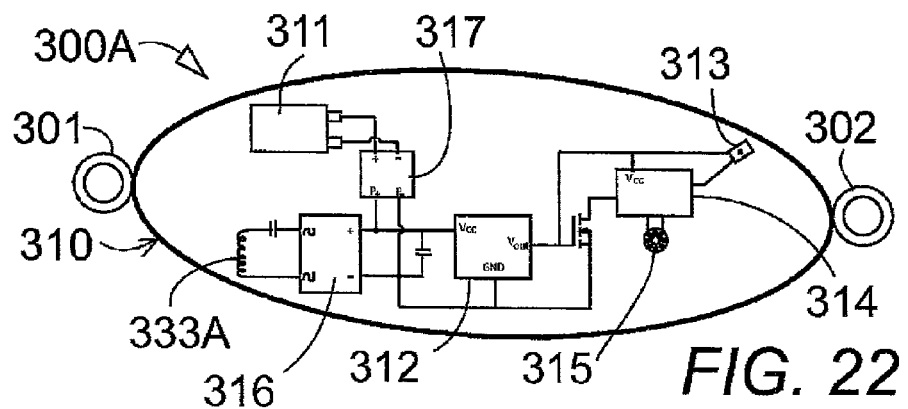
FIG. 22 is a schematic view of the module containing the sound producing circuitry of FIG. 21.
Figure 23:
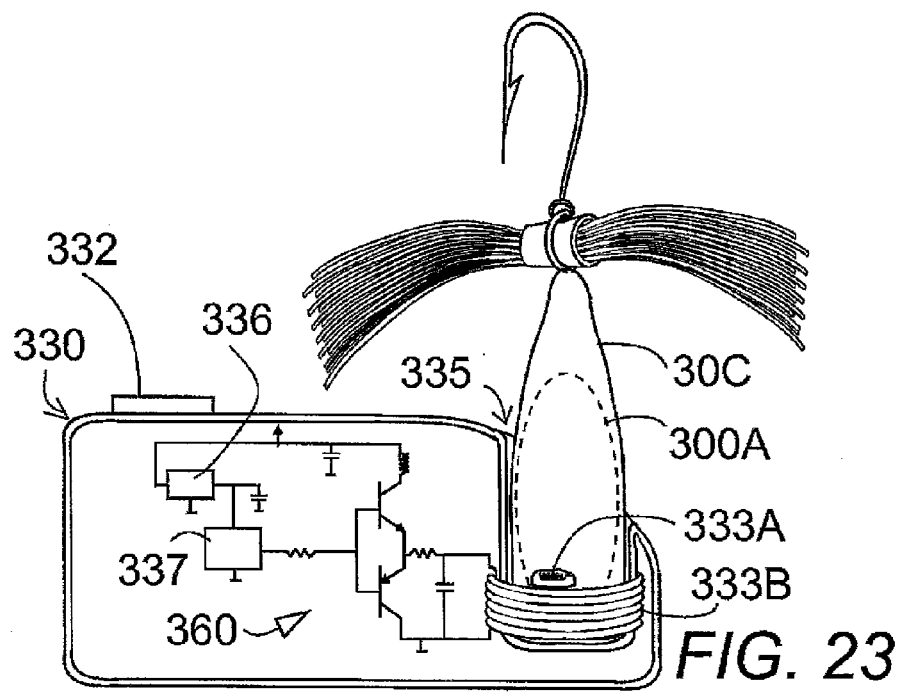
FIG. 23 is a diagrammatic cross-sectional elevation view of the battery charger of the preferred embodiment of the present invention showing the charging circuit of FIG. 21 inside the charger and a receptacle removably containing the lure having the module of FIG. 22 and showing the inductance pickup coil of the module in the lure and the mating inductance coupling coil positioned so that the coils are in close proximity to charge the battery inside the module and the lure.
Figure 24:
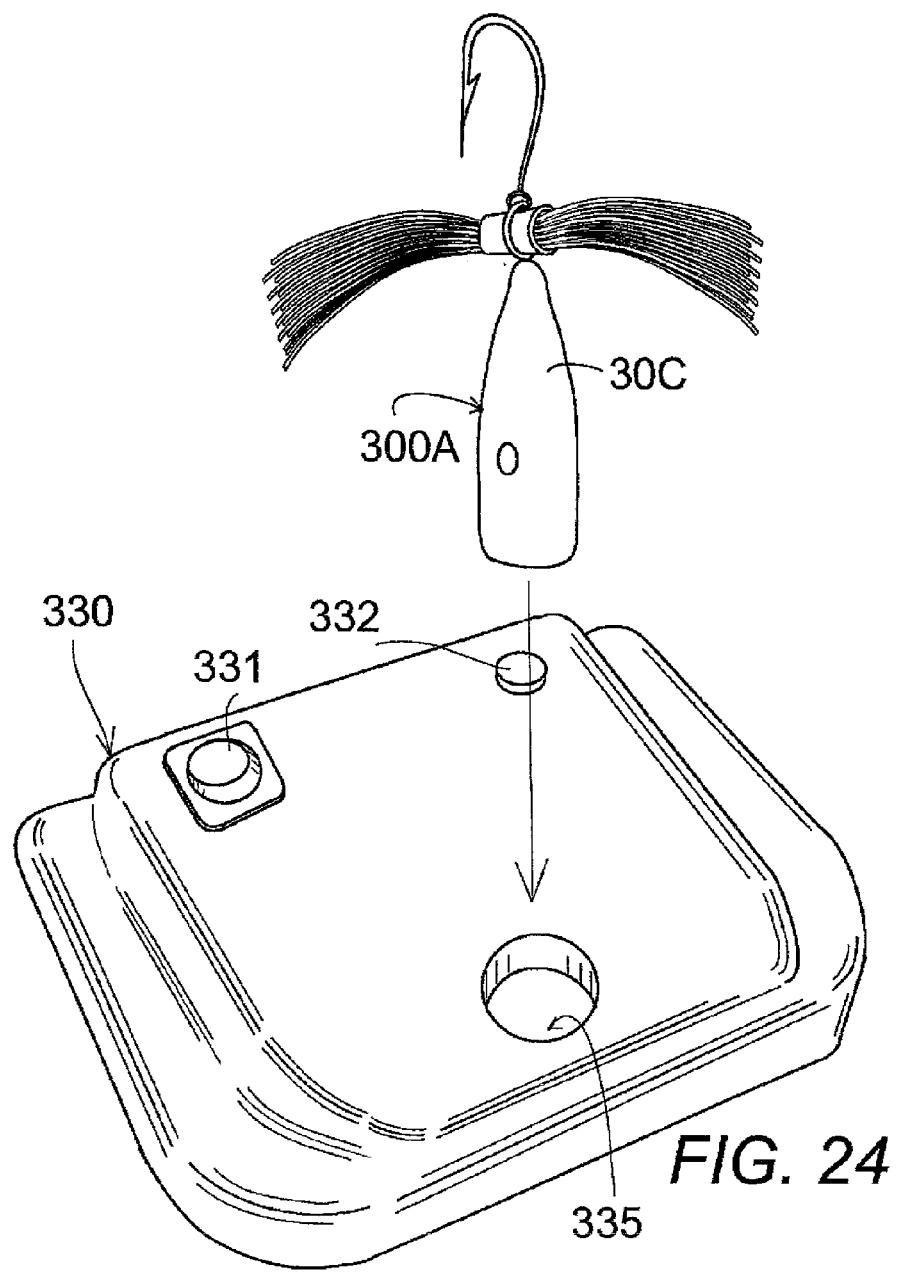
FIG. 24 is a perspective view of the battery charger of FIG. 23 showing the power button and charge indicating light on the top of the battery charger case and the sound producing lure lined up for insertion in the lure receptacle on the top surface of the case.
Figure 29:
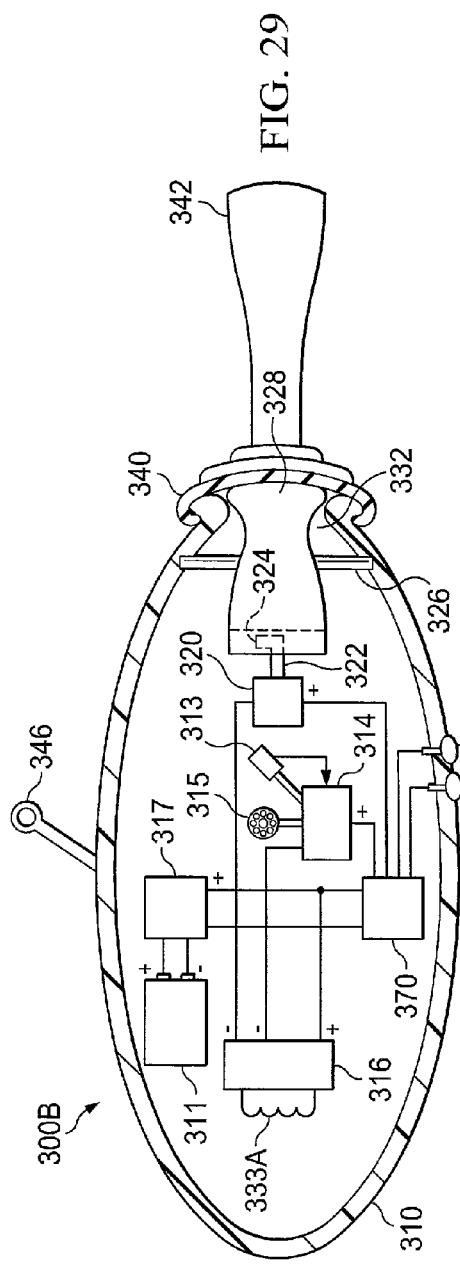
FIG. 29 is a is a schematic view of the module containing the sound and motion producing circuitry.
Figure 30:
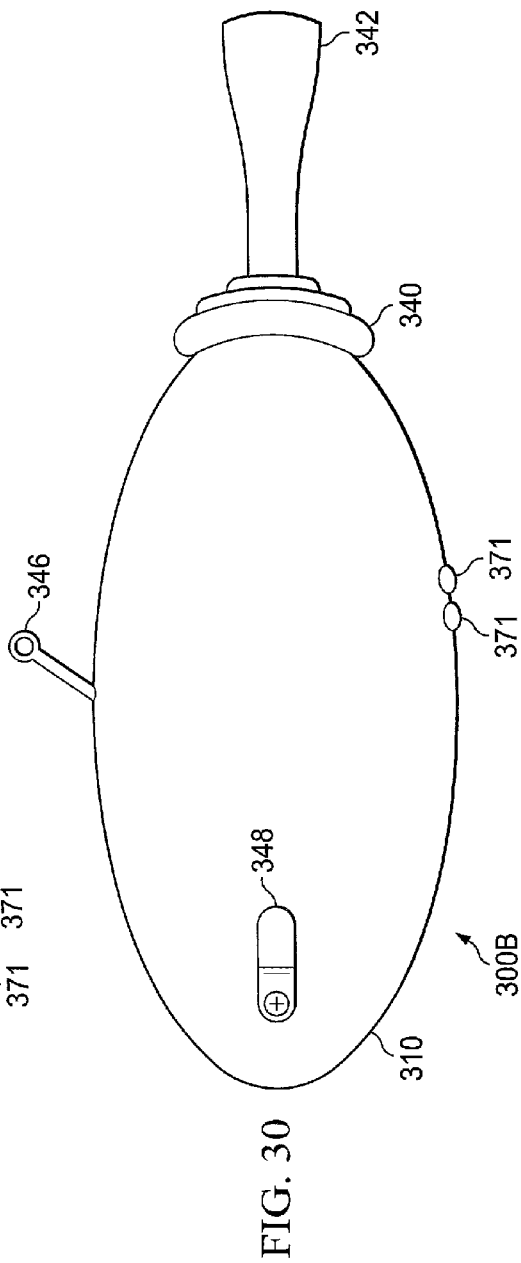
FIG. 30 is a side elevation view of the module of FIG. 29.

FIGS. 29 and 30 disclose module 300B capable of producing bait creature sounds and bait creature movements. In FIGS. 21-28, a preferred embodiment of the bait creature sound producing module 300A is shown. In FIGS. 16-19, an alternate embodiment of the bait creature sound producing module 300 is shown. Each module 300, 300A, and 300B is removably insertable in a lure body, such as a such as a popper type lure body 30C, as shown in FIGS. 20, 23-25 and 28, or a rubberized bait creature body 30B simulating a baby frog, tadpole with tail-like streamers, bream/sunperch, or shrimp as shown in FIGS. 18-20. Each module 300, 300A, and 300B has self contained electronics inside to broadcast an actual or simulated sound reproduction of a bait creature sound when activated by the fisherman. In an alternate embodiment, the modules 300, 300A, and 300B can be used without being inserted into a lure body.

Each of the watertight bait sound producing modules 300, 300A, and 300B is comprised of a water proof pod 310 having an exterior water tight housing and an interior space within the housing to contain electronic circuit 350. Electronic circuit 350 is comprised of a recorded sound producing chip 314 having a pre-recorded bait creature sound recorded thereon. Chip 314 is connected to micro speaker 315. Micro speaker 315 broadcasts the pre-recorded bait creature actual or simulated sound. Chip 314 is connected to motion switch 313. Chip 314 is connected to power source 311. Power source 311 provides power to the electronic circuit and its components. Power source 311 is a rechargeable battery, preferably a Lithium Polymer battery. In an alternate embodiment, power source 311 is a non-rechargeable battery. Motion switch 313 provides a means for the fisherman to remotely activate the electronic circuit and broadcast the pre-recorded bait creature sound stored on sound chip 314 through micro speaker 315. The sound emanating from the module 300, 300A, and 300B inside the fishing lure body in the water will attract fish that feed on the bait creature species.

As shown in FIGS. 18 and 19, a tug by a fisherman on a fishing line connected to the fishing lure body at line receiving ring 302 causes the fishing lure to tilt and triggers motion switch 313. Motion switch 313 has a triggered state and a non-triggered state. When triggered, motion switch 313 connects the electronic circuit components to power source 311. While motion switch 313 is triggered, sound chip 314 and micro speaker 315 produce the pre-recorded sound of the bait creature. As the fishing lure naturally returns to a non-tilted position, motion switch 313 disconnects the sound chip 314 and micro speaker 315 from power source 311.

The recorded sound producing chip 314 generates a pre-recorded simulated or actual sound of a live bait creature sound taken in a natural environment and taken from a list of simulated or actual sounds including a frog ribbit sound, a basspop cricket sound, a baby hatchling alligator squeaking sound, a crayfish clicking sound, a shad rattling buzzing sound, a mouse squeaking sound, a rat squeaking sound, a small fish sound in the water, an aquatic insect sound in the water, and a shrimp tail snap sound.

Figure 25:
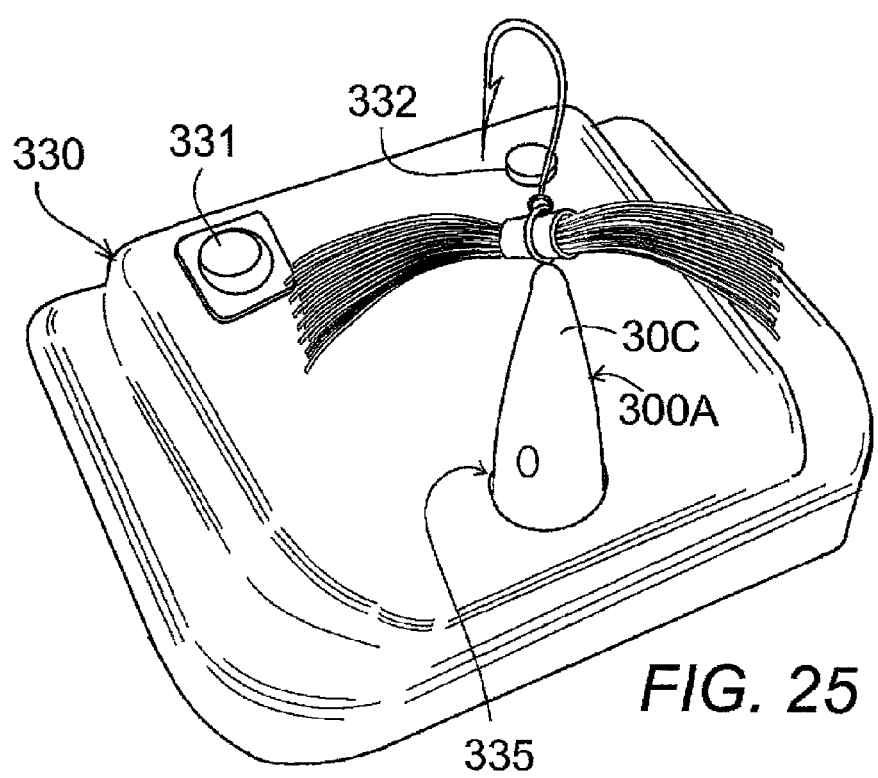
FIG. 25 is a perspective view of the battery charger of FIG. 24 showing the sound producing lure removably inserted in the lure receptacle on the top surface of the case for recharging the battery.
Figure 25A:
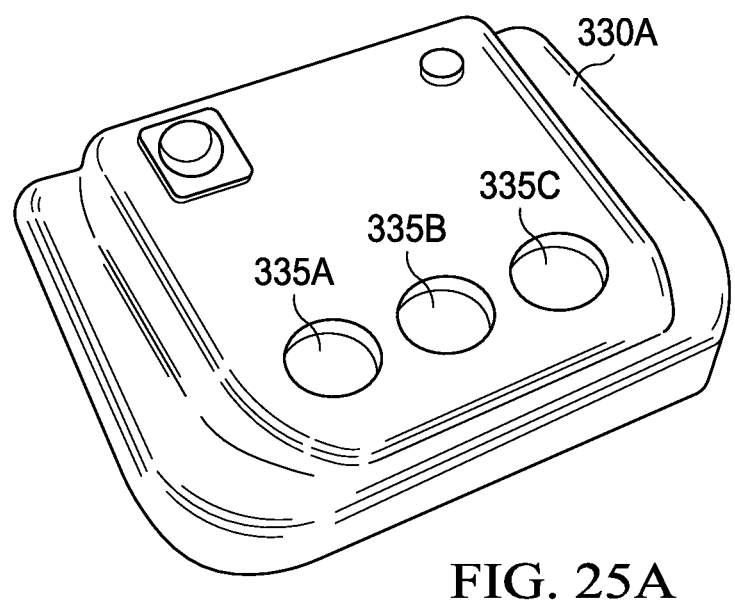
FIG. 25A is a perspective view of a battery charger with multiple receptacles.
Figure 26:
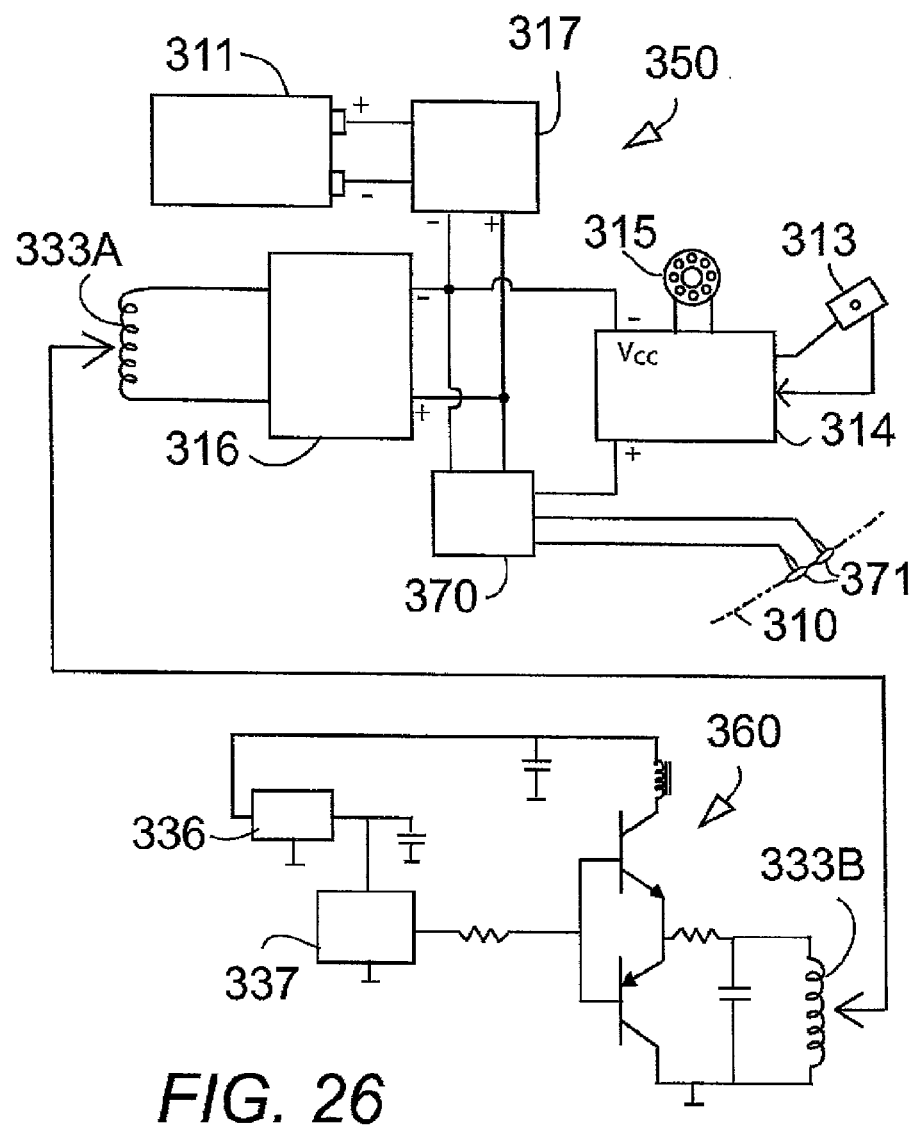
FIG. 26 is a schematic view of the preferred embodiment of the bait sound producing circuit and the charging circuit of the present invention, the sound producing circuit comprising an internal rechargeable battery powering the internal sound recording and playback chip and micro speaker for playing the pre-recorded actual or simulated sound of a bait creature for catching fish and a resonant inductive charging circuitry including an inductance pickup coil, a battery protection circuit and a moisture sensing on-off switch all using micro-miniature surface mount technology, and the inductance coupled battery charger comprising a mating inductance coupling coil positioned so that the coils are in close proximity to charge the battery inside the module and the lure.
Figure 27:
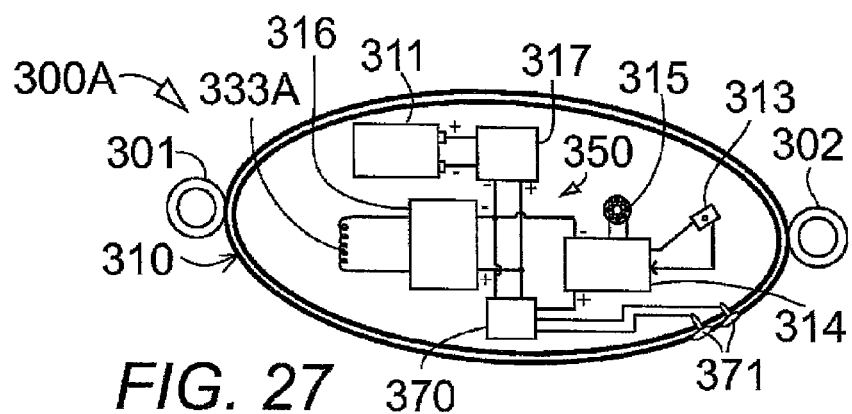
FIG. 27 is a schematic view of the module containing the sound producing circuitry of FIG. 26.
Figure 28:
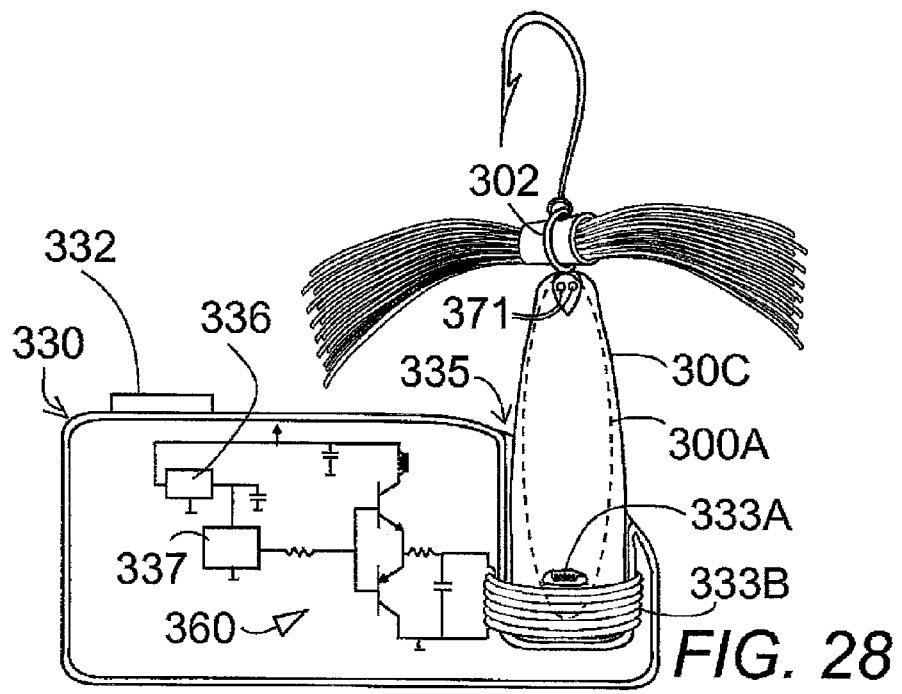
FIG. 28 is a diagrammatic cross-sectional elevation view of the battery charger of the preferred embodiment of the present invention showing the charging circuit of FIG. 26 inside the charger and a receptacle removably containing the lure having the module of FIG. 27 and showing the inductance pickup coil of the module in the lure and the mating inductance coupling coil positioned so that the coils are in close proximity to charge the battery inside the module and the lure.

As shown in FIGS. 21-29, power source 311 is connected to inductance pickup coil 333A. Inductance pickup coil 333A is located within modules 300A and 300B and adjacent the exterior surface of pod 310. Modules 300A and 300B may be inserted in any lure body. Charger 330 includes receptacle 335 for receiving the lure body. Charger 330 houses electronic circuit 360 which includes mating inductance coupling coil 333B. Coupling coil 333B is adjacent to (preferably surrounding) receptacle 335 so that coupling coil 333B is in close proximity to inductance pickup coil 333A when a lure body is seated in charger 330. Charger 330 can charge the power source 311 inside modules 300A, or 300B without removing the module from the lure. In an alternate embodiment, shown in FIG. 25A, Charger 330A includes multiple receptacles 335A, 335B, and 335C for receiving and charging multiple modules simultaneously. Each receptacle further includes an inductance coupling coil.

The preferred embodiment provides resonant inductive charging, a battery protection circuit, and a water sensing on-off switch. As shown in FIGS. 23-25 and 28, popper type lure body 30C is removably seated in receptacle 335 of the charger 330. Charger 330 automatically charges power source 311 included in module 300A. The charger runs off 12 v DC from a wall wart, car cigarette lighter socket or hooked up to the boat power or any 12 v DC source.

Coupling coil 333B and pickup coil 333A form a resonant tank circuit which detects the AC magnet field created by the external inductance coupled battery charger 330. The full wave bridge rectifier (FWBR) 316 converts the AC into DC. This filtered DC is applied to a battery protection circuit 317 which both protects and charges the power source 311 in a controlled manner Battery protection circuit 317 is operatively connected to power source 311, wave bridge rectifier 316, and moisture sensing on-off switch 370.

The embodiment of FIGS. 21-28 utilizes surface mount technology rather than discrete electronic components to make it about ⅒th the size of a discrete element circuit. It works the same as the discrete one with one exception. You no longer need to have a magnet permanently next to the lure to turn it off.

In FIGS. 26-30, the preferred embodiment of module 300A and 300B further comprises moisture sensing on-off switch 370 connected to sensing elements 371. Sensing elements 371 are mounted externally on the water tight housing 310 of the module. Sensing elements 371 communicate with moisture sensing on-off switch 370 which is further connected to the module circuit components 311, 313, 314 and 315, so that casting the lure into water activates the module circuit for use in the water and removing the lure from the water de-activates the module circuit.

The externally mounted sensing elements 371 extend to the interior of the housing and are preferably comprised of a pair of closely spaced electrically conductive elements such as micro-miniature brass nails. Sensing elements 371 are operatively connected with moisture sensing on-off switch 370. Moisture sensing on-off switch 370 is operatively connected between power source 311 and motion sensor 313, sound producing chip 314, and speaker 315. When module 300A is exposed to contact with a body of water, an electrical current passes through the water between the sensing elements 371, activates the sound module into an on mode, and thus connects power source 311 to the sound producing circuit components 313, 314, and 315. A fisherman can remotely activate sound module 300A with a tug on the line, which tilts the body of the lure and activates motion sensor switch 313 as desired. When sound module 300A is removed from contact with the water the module is de-activated into an off mode wherein the sound producing portion of the circuit no longer has power and cannot be activated.

As shown in FIGS. 29 and 30, module 300B further includes components for producing lifelike bait creature motion. Motor 320 is connected to power source 311 and moisture sensing on-off switch 370. Rotor shaft 322 extends from motor 320. Rotor shaft 322 includes cam 324 on its distal end. Housing 328 extends through opening 332 in pod 310 and is connected to paddle 342. Rubber boot 340 is adjacent paddle 342 and encloses opening 332 and the portion of housing 328 extending from pod 310 ensuring the waterproof integrity of pod 310 is maintained. Housing 328 includes rod 326. Rod 326 is pivotally attached to pod 310. Housing 328 is preferably constructed of carbon fiber and paddle 342 of flexible nylon thus ensuring the combination is lightweight and durable. Paddle 342 is adhered to the housing with adhesive as is common in the art. Attachment wire 346 extends from the exterior of pod 310. Attachment wire 346 is preferably stainless steel and includes a loop on its distal end. Attached to the exterior of pod 310 is tang 348. Tang 348 is attached to pod 310 with common in the art attachments features such as screws or adhesive. Tang 348 provides a temporary fastening point for a backwards pointing, offset shank, hook. Attachment wire 346 allows for the module and lure body to be attached to the main fishing line in an arrangement that is commonly referred to in the art as a Carolina rig. A backwards pointing hook is essential in a Carolina rig setup as the target fish tend to attack the lure from the front. Once the lure body is hit by a target fish, tang 348 releases the hook and the fisherman can then set the hook in the target fish as is common in the art.

Figure 31:
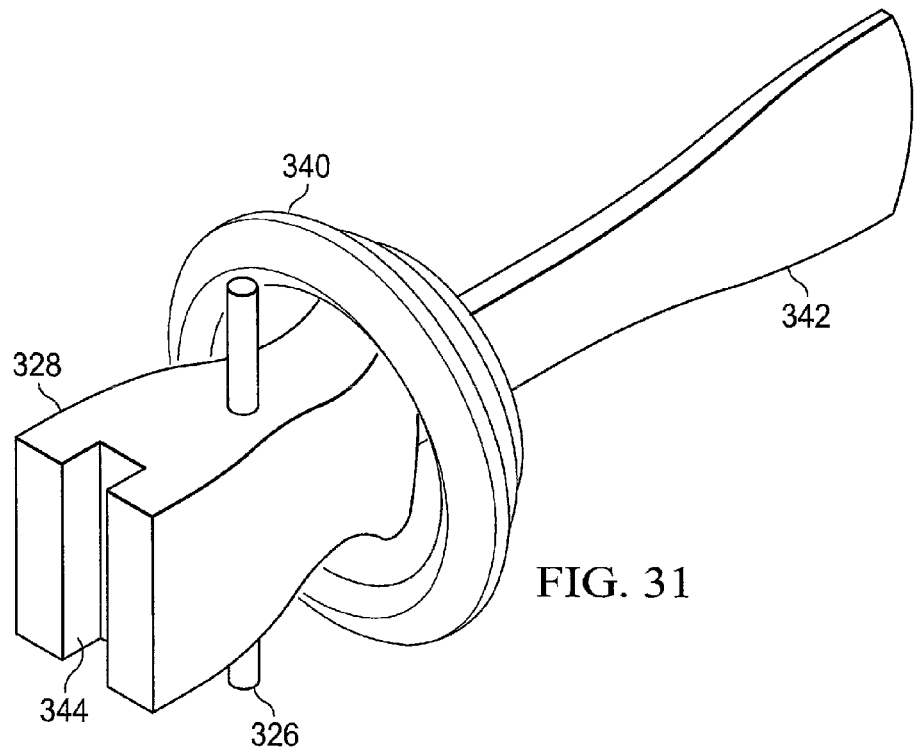
FIG. 31 is a perspective view of the housing and paddle of the module of FIG. 29.
Figure 32:
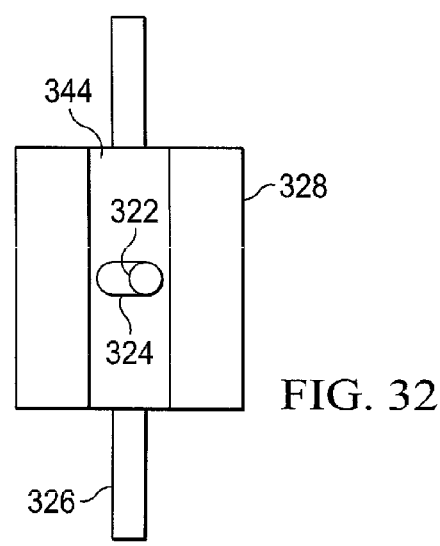
FIG. 32 is a front elevation view of the housing of the module of FIG. 29.
Figure 32A:
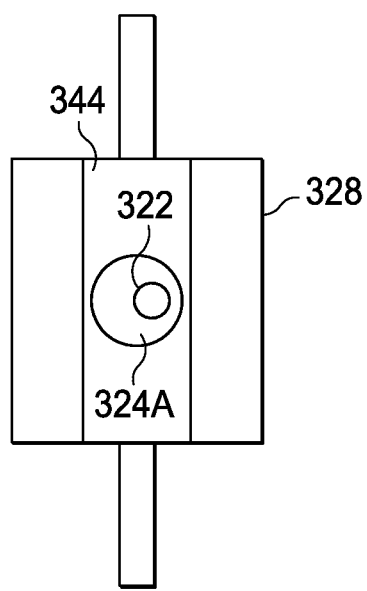
FIG. 32A is a front elevation view of an alternate embodiment of the housing.

As shown in FIGS. 31 and 32, housing 328 further includes slot 344. Slot 344 has a width sufficient to accommodate rotor shaft 322 and cam 324. Cam 324 is an arm extending from rotor shaft 322. In an alternate embodiment, as shown in FIG. 32A, cam 324A is comprised of an offset circular weight attached to rotor shaft 322.

In an alternate embodiment, module 300B replaces motion switch 313 with a timer switch. The timer switch activates the module to produce bait creature sounds and bait creature motion when the lure body is placed in a body of water. The timer switch can be programmed to activate module 300B for varying durations, e.g. on for two seconds, off for two seconds, or other combinations. When equipped with the timer switch, the fisherman need not activate the module with a tug on the line. The module will be activated automatically for the programmed duration of time once the moisture sensing elements sense the lure body is in a body of water.

In an alternate embodiment, modules 300, 300A, and 300B replace power source 311 with a primary cell, non-rechargeable battery that is designed to be used until battery power is discharged and then discarded.

In use, module 300B is removably inserted in a rubberized body resembling a bait fish such as lure body 30B and 30C. In alternate embodiments, module 300B may be inserted in other bait creature shaped lure bodies as well, particularly those that include a moving tail. The lure body containing module 300B is affixed to a fishing line via attachment wire 346 as is common in the art. The module is turned on when sensing elements 371 connected to moisture sensing on-off switch 370 sense the lure is in water. When activated, either remotely by motion switch 313 reacting to a tug on the fishing line by the fisherman or automatically by a timer switch, motor 320 inside module 300B rotates shaft 322. Cam 324 abuts housing 328 inside slot 344. Housing 328 repeatedly pivots side to side around rod 326. As a result of housing 328 pivoting around the linear axis of rod 326, paddle 342 also moves in a side to side motion, simulating the tail movement of a bait creature as it swims. Simultaneously, the module broadcasts bait creature sounds as previously described. Module 300B is deactivated by either the motion switch or the timer switch. Module 300B is turned off once removed from the water.

Figure 33:
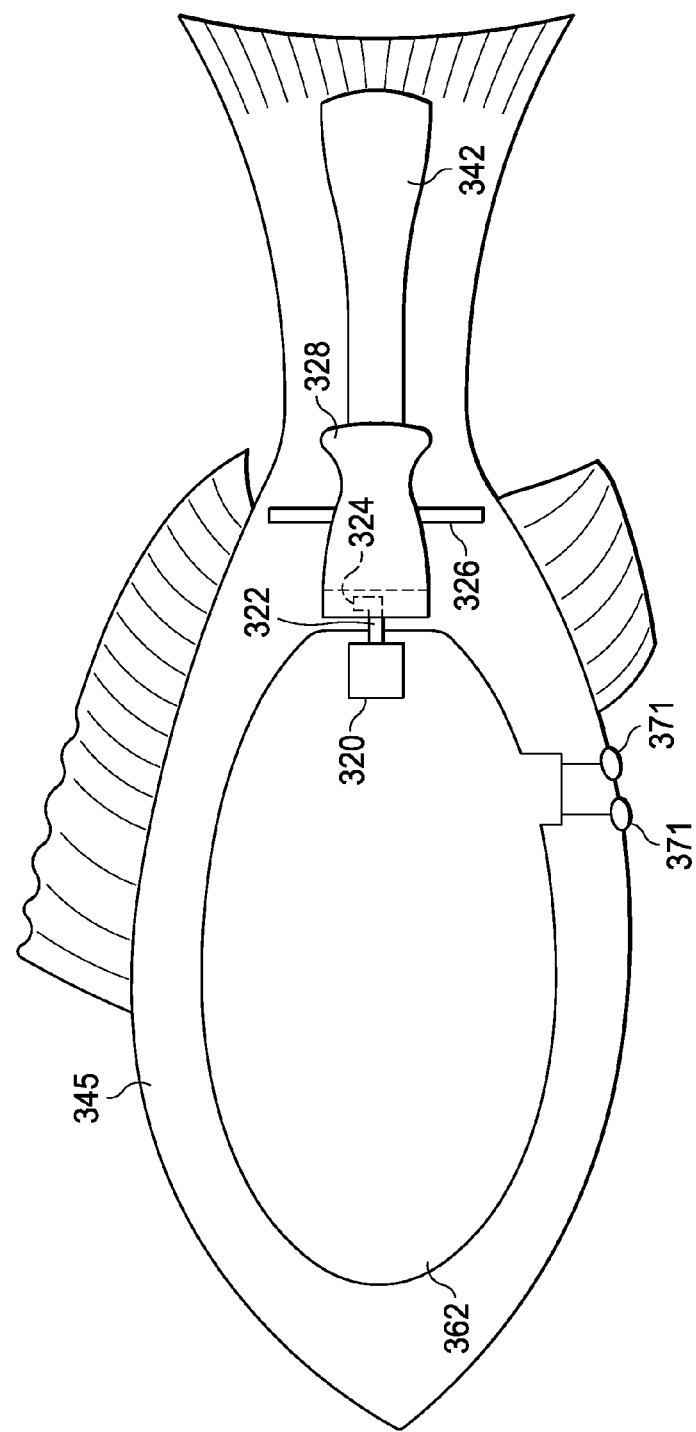
FIG. 33 is a side elevation view of an alternate embodiment of a lure body.

Referring to FIG. 33, in an alternate embodiment, the components for reproducing the actual or simulated sound and motion of the bait creature are encapsulated in a lure body. In this embodiment, the components are each mounted on printed circuit board 362 and encapsulated in a suitable watertight epoxy. Lure body 345 is waterproof and flexible. Lure body 345 is shown shaped as a small fish, however, other shapes such as a frog, a tadpole, a crayfish, a shad, a hatchling alligator, a cricket, a bream, a mouse, or a shrimp are also envisioned. The circuit components including power source 311, motion switch 313, sound module 314, speaker 315, moisture sensing on-off switch 370, and sensing elements 371 and the components for producing lifelike bait creature motion including motor 320, rotor shaft 322, cam 324, housing 328, and paddle 342 are contained within lure body 345. Sensing elements protrude from the interior of lure body 345 to the exterior of lure body 345.

The sound module of FIGS. 21-25 comprises an on-off magnetic latch switch 312 so that swiping a South pole of a magnet past the lure activates the sound module circuit for use in the water and swiping a North pole of a magnet past the lure de-activates the sound module circuit for storage. A small pencil size wand with a small magnet on each end is used to turn the power on and off.

A rare earth magnet turns the magnetic actuated latch switch 312 on or off. When the switch is on, it latches a ground on the gate 318, connecting power source 311 to activate the programmable sound module 314. When the motion switch 313 detects a motion it triggers the sound module 314 to output the stored sound recording to the speaker 315. The sound module is turned on by swiping the South pole of a magnet past magnetic actuated latch switch 312. Swiping the North pole turns it off.

In FIGS. 16-19, the alternate embodiment of the fishing lure body 30B further comprises an alternate battery charging mechanism comprising an electrically conductive means, such as line receiving loop 302, for attaching the fishing line at a forward end and an electrically conductive hook attaching loop 301 for hooking a fish at a rearward end. Power source 311 comprises a rechargeable battery, preferably a Lithium Polymer battery which connects to the electrically conductive line receiving loop 302 means for attaching the fishing line and the electrically conductive hook receiving loop 301 means for hooking a fish, so that power source 311 is rechargeable inside the sound module by attaching leads from a lithium battery charger to the two loops without removing the rechargeable battery from the sound module.

The sound module is turned on and off by a magnetic field actuated electronic microcircuit switch inside the sound module that is activated by momentarily placing either the magnetic North or magnetic South end of a magnet in close proximity which causes the switch, and therefore the sound module, to be turned either on or off. When in the off position, the lithium battery contained within the sound module can be recharged by connecting an appropriate lithium battery charger positive (+) lead to the sound module line connection and the negative (−) lead to the sound module hook connection.

The fishing lure body 30B preferably simulates the body of the bait creature which produces the sound recorded and reproduced by the sound module in the fishing lure body and the tug on the fishing line creates motion to simulate motion of a bait creature, as shown in FIG. 19.

The sound module 300 and the fishing lure 30B are fabricated of buoyant material to float in the water with a tail end of the fishing lure angled downwardly or a sinking material with the lure sitting on the bottom at an angle, as shown in FIG. 18, so that a tug on the fishing line attached to the front of the floating fishing lure causes the front of the fishing lure to tilt downwardly to trigger the motion switch 313, as shown in FIG. 19.

In FIG. 20, a soft rubber shad fish shaped lure 30B has a flexible rubberlike simulated body 20B having a hollow body cavity that the sound module 300 slips into. The form is basically silver colored with a black dot on the side and yellow on the very end of the tail and has red lips. The modules size ranges from 1½" to 2½" long and ½" to ⅝" in diameter and are torpedo shaped. Shad is a small minnow like fish that grows to be perhaps 3 to 4 inches long. They are slim, silver and congregate in large schools. They are the bass second preferred food source after crayfish. They make a sort of rattling, buzzing sound when the bass attacks the school and they flee. They catch bass, catfish, walleye, pike, trout, crappie, anything that can catch them.

In use, the preferred embodiment of the floating lure containing a sound module of the bait creature sought by the type of fish in the water being fished is cast into the area believed to hold bass or other type of fish desired and allowed to sit still for a short time either floating or on the bottom depending on lure choice. At that time the lure will sit in a slightly tail down posture causing the sound module within the lure to be off.

When the lure is later "twitched" by a gentle tug on the fishing line connected to the lure to produce motion in the lure to simulate a live bait creature, wherein the lure tips slightly forward causing the motion detection switch within the module to create a electronic trigger signal which turns on the programmable sound I.C. which sends a pre-recorded actual or simulated frog, crayfish, shad, hatchling gator, cricket, or other bait creature sound to a miniature waterproof speaker 315 of the sound module. This causes the lure to both wriggle in the water and to emit an actual or simulated sound of a frog, crayfish, hatchling gator, shad, cricket, or other bait creature.

Power source 311 within the sealed module 310 is rechargeable by placing a magnet in close proximity to the built in magnetic reed switch 312. This causes the battery to be connected directly to the front line (+) ring 302 and the rear hook (−) ring 301 for charging. Note: as the battery is not connected to the (+) ring when the module is activated by removing the magnet, the lure can be used in both salt and fresh water without discharging the battery via the water.

The legs of a fisherman's choice, color, shape etc. can be easily inserted into the lure body to simulate the bait creature preferred by the type of fish the fisherman desires to catch.

The electronic sound module may be built in as a part of a complete lure or a sound module can be inserted into a hollow rubber form and when activated causes a pre-recorded frog, crayfish, shad, cricket, gator, or other bait creature sound. When activated the sound module produces an electronic pre-recorded audio actual or simulated sound of a frog, gator, crayfish, shad, cricket, or other bait creature housed in a mating bait creature simulated body matching the bait creature sound produced.

The sound module is a little smaller and the same shape as an adult thumb. What is needed is a lure that closely replicates the size, shape, color and sound of a frog, crayfish, hatchling gator, shad, cricket, or other bait creature which are primary food sources of bass. This lure fills all those needs. The lure module is a small, self contained and sealed electronic sound producing module that is activated by a tipping movement of the module.

The lure module has a programmable integrated circuit (I.C.) that is programmed with the recording of the actual or simulated sound of a frog, a hatchling gator, a crayfish, a shad, a cricket, or other bait creature. The module has a magnetic built in reed switch. When a magnet is in close proximity to the switch the sound module is off and the internal Lithium Polymer battery is connected directly to the line connection (+) and the hook connection (−) for charging. When the magnet is removed, the battery is disconnected from the (+) terminal and is connected to the module electronics which turns on the module. When the module is tipped it creates an electronic trigger signal that causes the speaker to emit the pre-recorded sound. The module can be placed within the hollow rubber form of a frog, crayfish, gator, shad, or other bait creature shape of choice or built into a hollow body plastic lure of any shape. Typical hollow lure bodies have the feature wherein the "legs" can be exchanged readily without affecting the module. Note that the stand alone module has no leg slots as the hollow rubber forms contain the slots. When the module is built into a hollow plastic form, the form has the leg slots.

In FIGS. 1-19, a remote radio controlled robotic fishing lure device 10 records and plays back a bait creature's actual or simulated recorded sound and also simulates the size, shape, and movement of the bait creature in many embodiments.

In FIG. 1, a watertight simulated body 30 of a simulated fishing bait creature, a frog in this embodiment, comprises a hard inner upper shell 130 snapped together to a hard inner lower shell 140 each with a rubberized outer covering 20 simulating the outer skin of the bait creature. Pins 32 in one half snap fit into mating holes 33 in the other half. A watertight inner space 31 houses at least one radio receiver 90 and at least one magnetic actuator 100 for creating motion positioned therein. The radio receiver 90 communicates with the magnetic actuator 100. The simulated body 30 has a number of openings 34 around the perimeter for receiving extremities 50 attached thereto in a watertight fit.

The magnetic actuator 100 and 210 may comprise a rare earth magnet actuator or a servo mechanism imparting motion to the control arm.

The power source preferably comprises a rechargeable battery 80 within the lure body having battery charger connections extending outside of the lure body in the fishing line attachment ring and hook attachment ring so that the lure does not have to be taken apart or any inside access necessary at all in order to charge the battery.

The flexible simulated extremities 50 of the fishing bait creature each comprise a soft rubberized replica of an extremity 50 of the fishing bait creature, in this case a frog leg, which fits with a tight watertight fit in one of the openings 34 in the body of the fishing bait creature to plug the opening so that the body is sealed watertight. The magnetic actuator 100 is attached to each of the extremities 50 by means for linking the at least one magnetic actuator to each of the extremities to enable the at least one magnetic actuator 100 to create movement simulating the natural movement of each extremity in the fishing bait creature.

In FIGS. 1 and 2, a control arm 160 is attached to the magnetic actuator 100 and optional extension control arms 161 connecting to extremity moving arms 50 which extend from inside the simulated body into an extremity 200. Each extremity moving arm 50 is pivotally attached to the control arm wherein the magnetic actuator imparts a back and forth motion (shown by internal arrow) to the control arm 160 and the control arm imparts a movement to the extremity moving arm to create the simulated extremity movement (shown by external arrows). The control arm 160 is further attached to a spring 70 attached to the body to draw the control arm 160 toward the back after the magnetic actuator 100 drawings the control arm 160 forward to create the back and forth motion to move the extremities.

Figure 6:
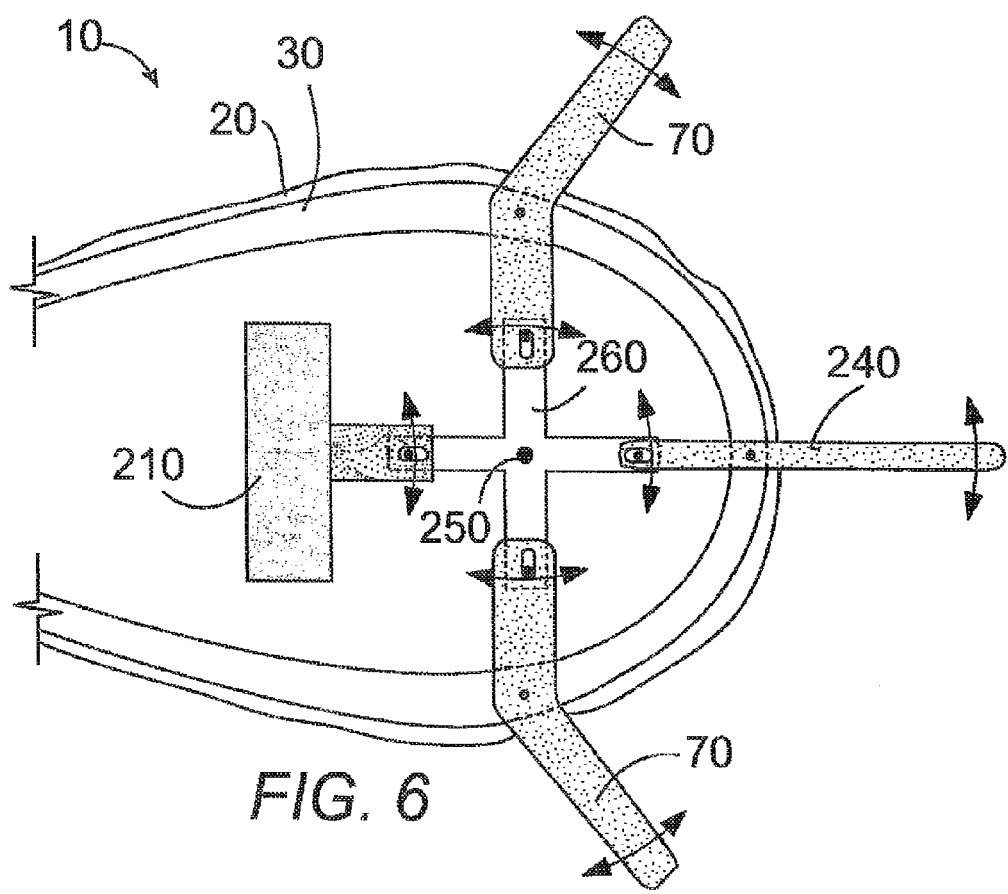
FIG. 6 is a top sectioned view of a third embodiment device.

In FIG. 6, the control arm 260 pivotally attached to the actuator 210 has a plurality of extension control arms which each connect to an extremity moving arm such as leg extremity moving arms 70 and tail extremity moving arm 240 activate an extremity moving arm. The control arm 260 is further attached to a control arm pivot mechanism 250 in the center of the control arm connected to an interior surface of the simulated body.

Figure 3:
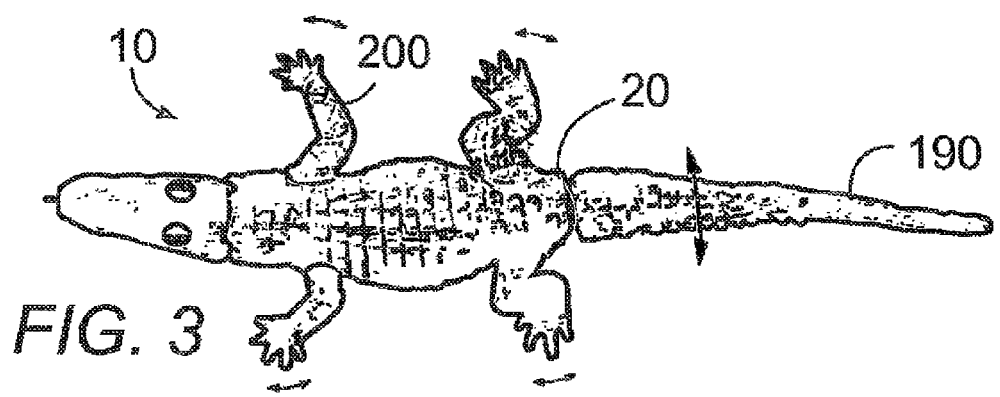
FIG. 3 is perspective top view of a second embodiment device illustrated as an alligator wherein both front legs, both back legs, and the tail can move either independently or in any combination.
Figure 4:
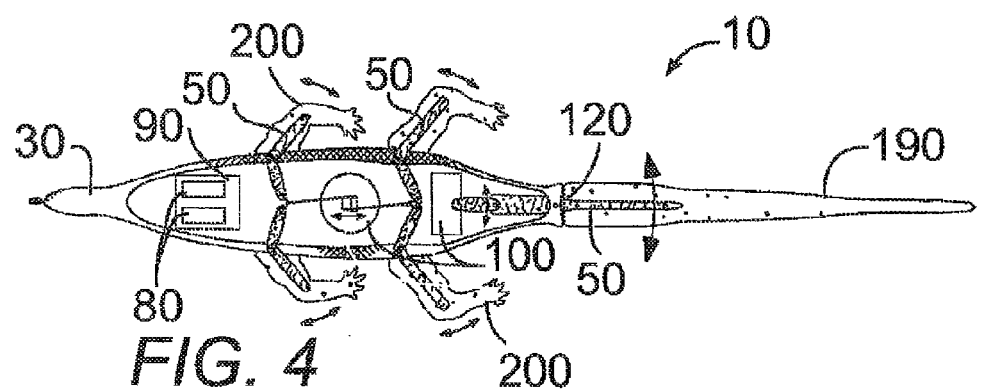
FIG. 4 is a top sectioned view of the second embodiment device.
Figure 5:
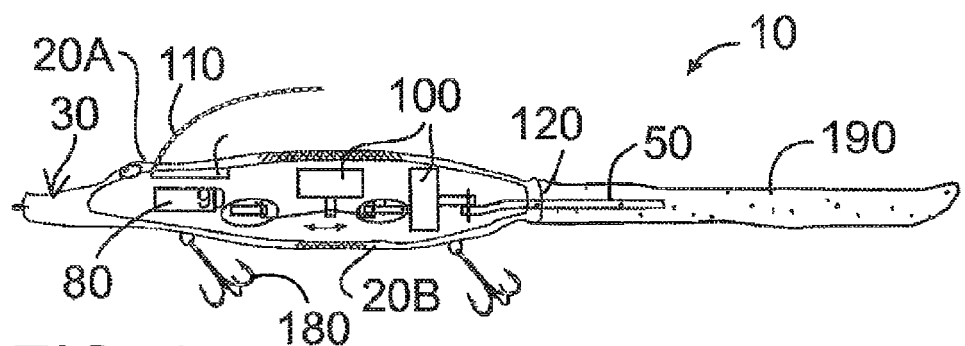
FIG. 5 is a side sectioned view of the second embodiment device

In FIGS. 1-6, the lure body comprises a molded body in the shape of a bait creature taken from the list of bait creatures comprising a frog in FIGS. 1 and 2, a baby alligator in FIGS. 3-5, a fish, and an aquatic insect.

In FIGS. 1 and 2, the molded body 30 is in the shape of a frog and the extremities 200 comprise simulated frog legs that simulate a kicking motion natural to frog legs so that the extremities simulate a natural swimming motion of a frog in water.

In FIGS. 3-5, the simulated body 30 is in the shape of a baby alligator and the extremities comprise simulated baby alligator legs 200 that simulate a kicking motion natural to baby alligator legs and a simulated baby alligator tail 190 that simulates a natural side to side swinging movement (arrows) of a baby alligator tail so that the extremities simulate a natural swimming motion of a baby alligator in water.

Figure 8:
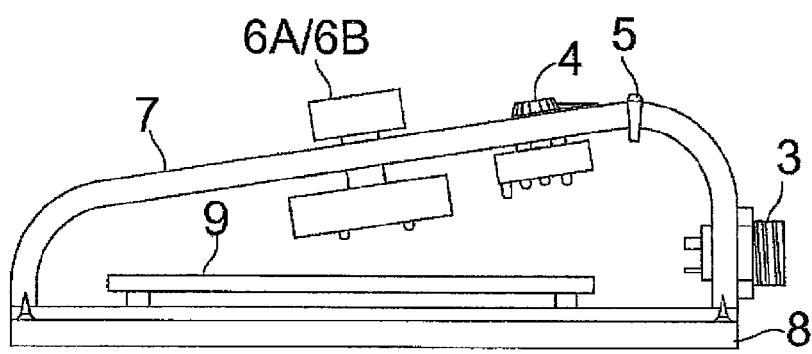
FIG. 8 is a sectional side view of the remote control of FIG. 7.
Figure 9:
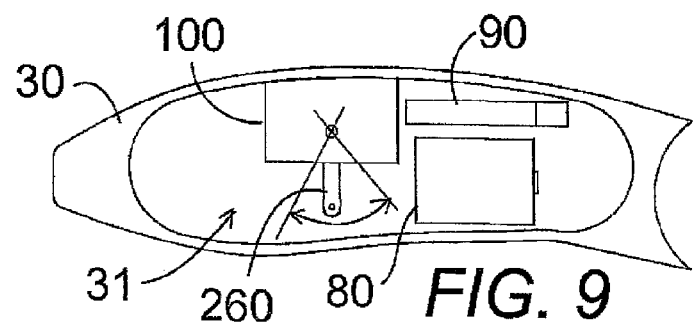
FIG. 9 is a side sectioned view of a basspop body having the radio receiver, batteries, and magnetic actuator with an actuator arm in the body interior.
Figure 10:
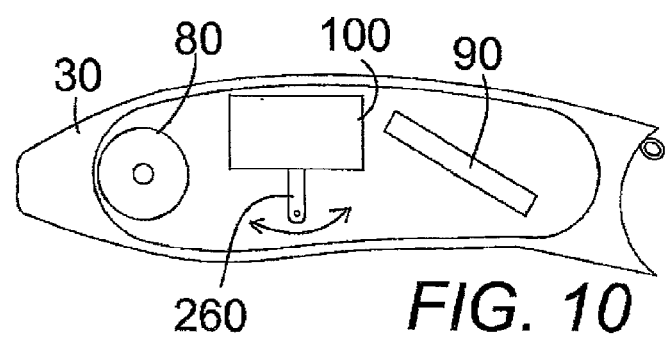
FIG. 10 is a side sectioned view of a basspop body having alternate positioning of the radio receiver, batteries, and magnetic actuator with an actuator arm in the body interior.
Figure 11:
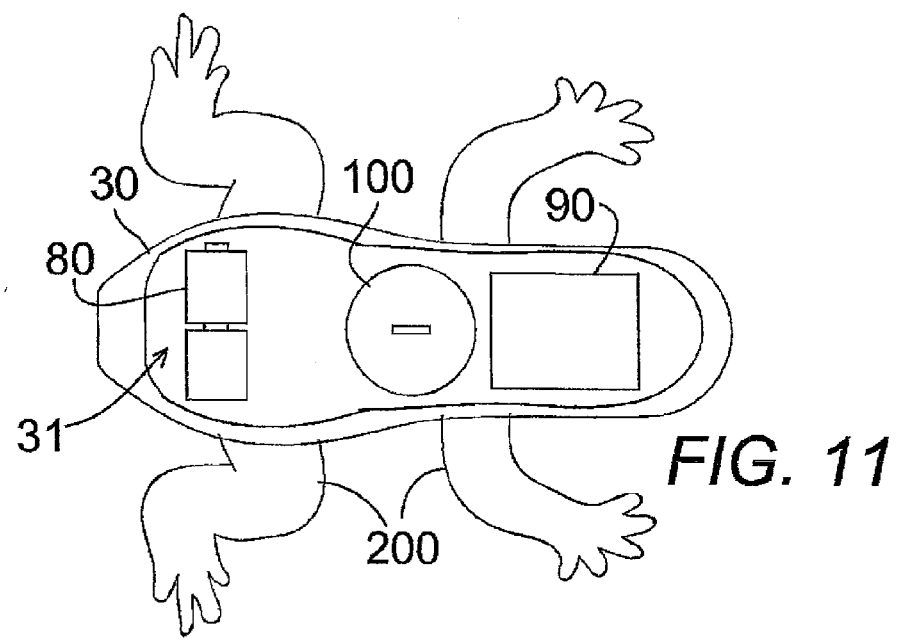
FIG. 11 is a top sectioned view of a basspop body having the radio receiver, batteries, and magnetic actuator with an actuator arm in the body interior and showing the external legs.

In FIGS. 9-11, the simulated body 30 with interior space 31 is in the shape of a basspop and the extremities comprise simulated basspop legs 200 that simulate a kicking motion activated by a control arm 160 attached to a magnetic actuator 100 powered by a battery or batteries 80 and receiving signals through a radio receiver 90 from the remote control (7 as in FIGS. 7 and 8) held by the fisherman.

A sound generating microchip 12 and subminiature speaker 13 for bait animal sound generation on demand are installed within the watertight simulated body 30, the microchip 12 communicating with the radio receiver so that the radio transmitter 9 sends a separate signal activated by a second foot button 6B on the remote control to the radio receiver 90 causing the radio receiver to activate the sound generating microchip 12 to make a pre-recorded sound through the subminiature speaker 13 of a natural recorded sound of the fishing bait creature. The microchip 12 generates a pre-recorded sound depending upon the nature of the fishing bait creature simulated body housing the microchip, the pre-recorded sound is of a live bait animal sound taken in a natural environment and taken from the list of simulated sounds including a frog ribbit sound, a basspop cricket sound, and a baby alligator hatchling squeaking sound.

Figure 7:
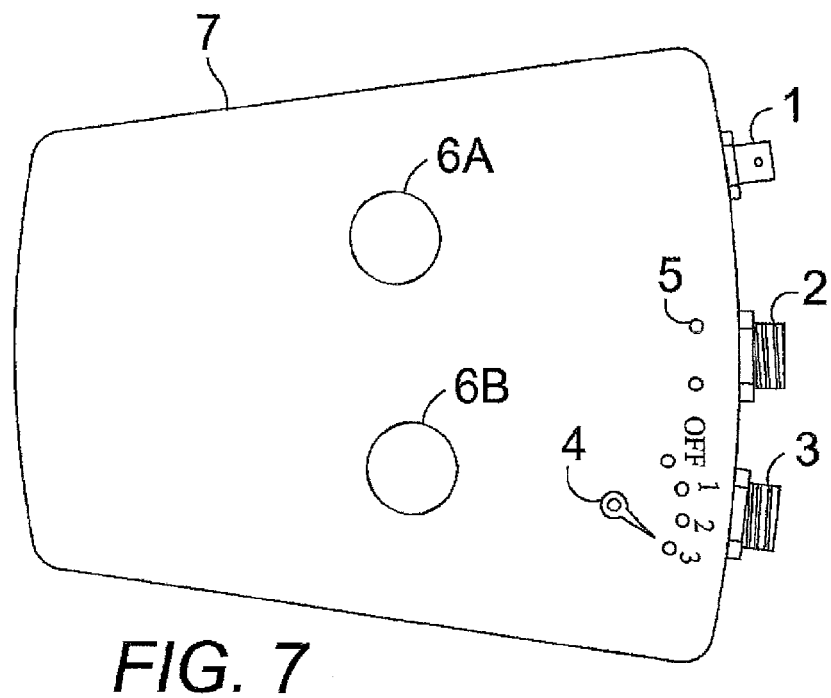
FIG. 7 is a top plan view of the remote control of the present invention.

In FIGS. 7 and 8, a hand and foot operated remote control 7 housing a radio control transmitter 9, the remote control alternately held by a user in a first position for hand control with a hand control switch 4 for turning the magnetic actuator 100 on and off and setting the choice of which robotic lure is being used, and alternately positioned near a foot of a user in a second position for foot control using a first foot actuated button 6A for controlling motion in the robotic lure and a second foot actuated button 6B for controlling sound in the robotic lure while a user holds a fishing rod, the radio control transmitter controlling the robotic fishing lure device for fishing, the radio control transmitter wirelessly communicates with the radio receiver 90 in the simulated body which activates the magnetic actuator 100 to create movement in each of the extremities 50 simulating the natural movement of each extremity in the fishing bait creature. A mating hook and loop fastener patch 8 on the bottom of the remote control allows it to be removable attached to the carpeting on a fishing boat or other convenient location. An antenna is removably attachable to the BNC antenna connector 1 on the remote control. A power source is connectable to the two conductor male power connector 2 on the remote control. The remote control is connectable to a power charge source via a two conductor female charge connector 3 on the remote control. An antenna 11 transmits the radio signals from the remote control to the receiver 90.

In FIGS. 12-15, an alternate watertight simulated body 30A of a simulated fishing bait creature or a similarly sized body, which may be a rubberized body and has a rubberized outer covering 20 simulating the outer skin of the bait creature and each provides a moving outer appendage element which moves as the body is dragged through the water and an internal sound generating housing 150 inserted in the body. The sound generating housing 150 encloses a sound generating microchip 12 and subminiature speaker 13 for bait animal sound generation on demand installed within the watertight simulated body 30. The microchip 12 communicates with the radio receiver 90 so that the radio transmitter 9 sends a separate signal activated by a second foot button 6B on the remote control to the radio receiver 90 causing the radio receiver to activate the sound generating microchip 12 to make a pre-recorded sound through the subminiature speaker 13 of a natural recorded sound of the fishing bait creature. The sound generating housing 150 may be fabricated of buoyant material so that the simulated body 30A floats with the sound generating housing inserted therein. The sound generating housing 150 may be removed and replaced.

Figure 12:
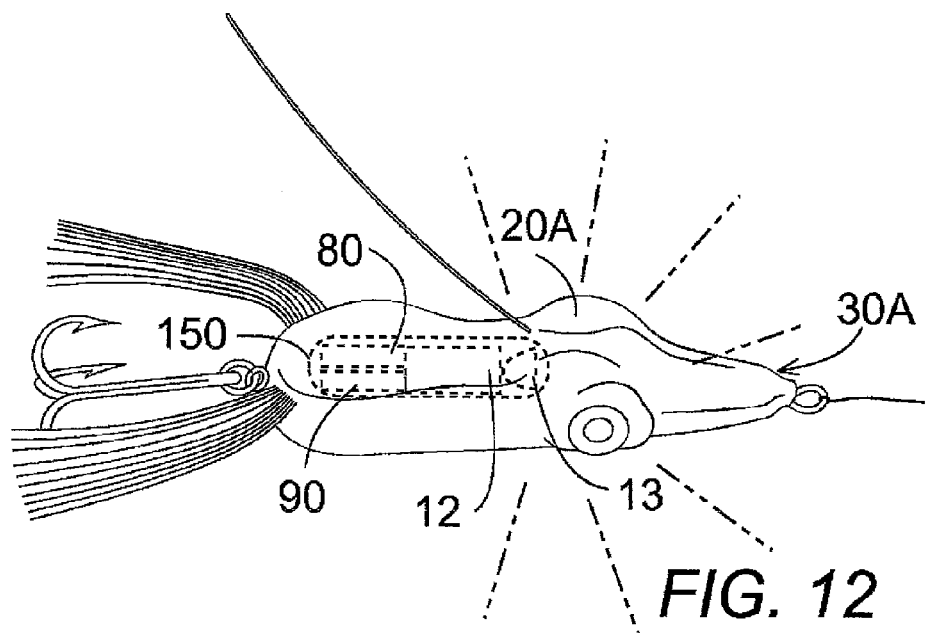
FIG. 12 is perspective top view of another embodiment device of the present invention illustrated as a baby frog or tadpole with tail-like streamers showing the internal power source, receiver, and sound transmitter.

In FIG. 12, the watertight simulated body 30A, having a rubberized outer covering 20A, simulates a baby frog or tadpole with tail-like streamers showing the sound generating housing 150 having an internal power source 80, radio receiver 90, sound generating microchip 12 and sound transmitter, such as a subminiature speaker 13.

Figure 13:
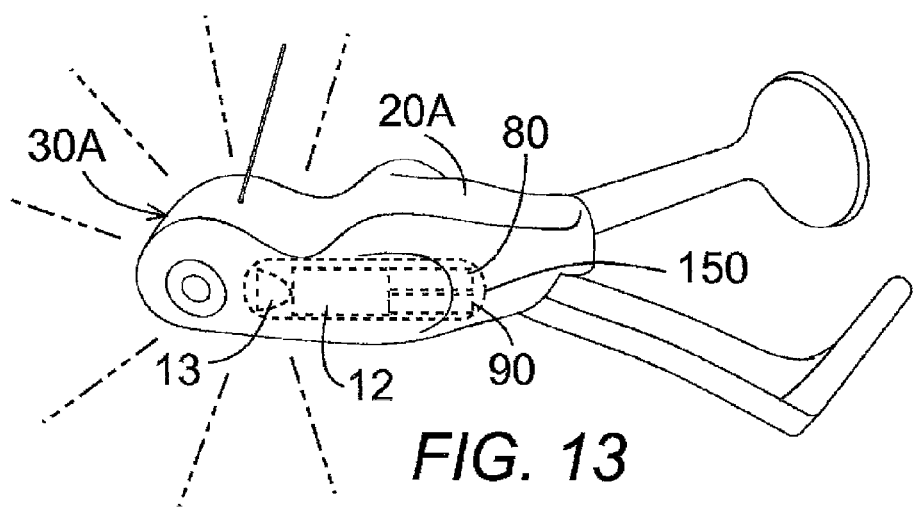
FIG. 13 is perspective top view of another embodiment device of the present invention illustrated as a baby frog with wagging feet showing the internal power source, receiver, and sound transmitter.
Figure 16:
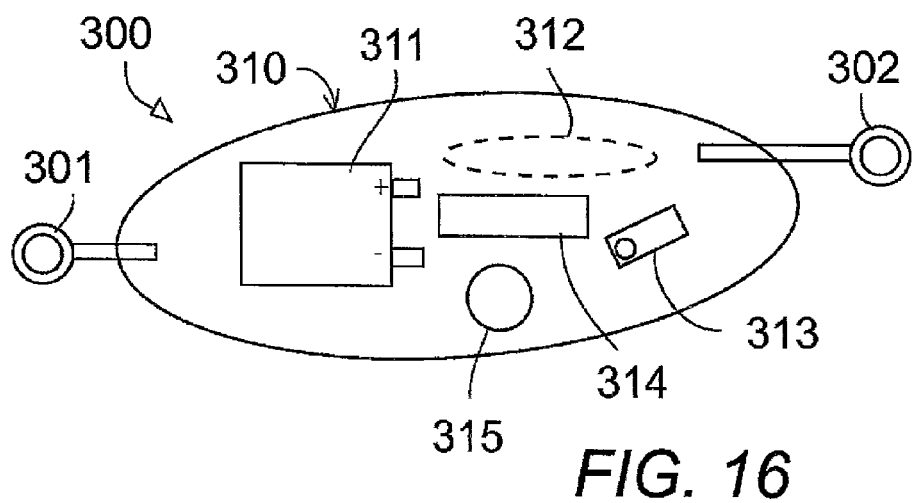
FIG. 16 is a schematic top plan view in section of the bait sound producing fishing module of the present invention showing the interior components and the two conductive end extensions used in charging the internal battery powering the internal sound recording and playback chip and micro speaker for playing the pre-recorded actual or simulated sound of a bait creature for catching fish.
Figure 17:
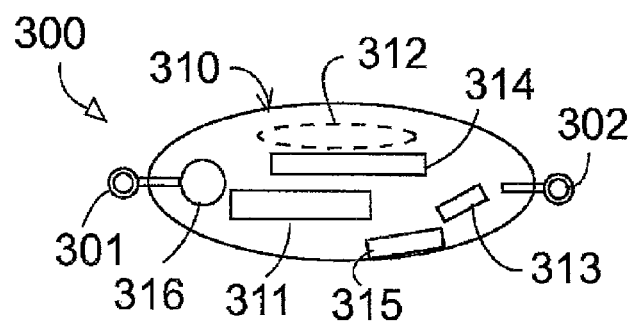
FIG. 17 is a schematic side elevation view in section of the bait sound producing fishing module of FIG. 16.

In FIG. 13, the watertight simulated body 30A, having a rubberized outer covering 20A, simulates a baby frog with wagging feet showing the sound generating housing 150 having an internal power source 80, radio receiver 90, sound generating microchip 12 and sound transmitter, such as a subminiature speaker 13.

In FIG. 14, the watertight simulated body 30A as a rounded rectangular body, having a rubberized outer covering 20A, simulates the size of a fishing bait creature with trailing hook wagging behind, showing the sound generating housing 150 having an internal power source 80, radio receiver 90, sound generating microchip 12 and sound transmitter, such as a subminiature speaker 13.

In FIG. 15, the watertight simulated body 30A as a rounded rectangular body, having a rubberized outer covering 20A, simulates a large insect with tail-like streamers showing the sound generating housing 150 having an internal power source 80, radio receiver 90, sound generating microchip 12 and sound transmitter, such as a subminiature speaker 13.

In use, the watertight simulated body 30 and 30A of the radio controlled fishing bait creature is attached to a fishing line and cast into the water. The remote control 7 is turned on and adjusted to the desired choice of robotic lure being used with the manual control 4. The remote control may be placed on the ground fishing boat carpet or attached to a bait box on the ground and operated by a foot of a user on the foot control buttons 6A and 6B while the fisherman holds the fishing rod and reel with two hands. The bottom hooks 180 hook a fish attacking the lure.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A bait sound and motion producing apparatus comprising:
   a flexible waterproof body encasing an electronic circuit and a set of motion components;
   the electronic circuit comprises a memory chip, a timer switch, a speaker, a moisture sensing switch, and a battery;
   the memory chip connected to the speaker and the timer switch, where the timer switch has a first state and a second state;
   the memory chip connected to the moisture sensing switch and the battery, where the memory chip includes a bait sound stored thereon;
   the moisture sensing switch connected to a set of sensing elements, where the set of sensing elements extends externally of the body;
   the set of motion components comprises:
   a motor connected to the battery and the moisture sensing switch, for moving the waterproof body, the motor having a rotor shaft extending therefrom, the rotor shaft having a cam extending at an angle relative to a longitudinal axis of the rotor shaft;
   a housing with forward and rearward ends defining a longitudinal axis therebetween, the housing having a vertical slot at the forward end which is transverse to the longitudinal axis of the housing, the cam of the rotor shaft being positioned inside the vertical slot such that rotation of the rotor shaft results in the cam moving the housing back and forth in a lateral direction, the housing including a rod having opposed portions extending both transversely to the longitudinal axis of the housing and from upper and lower sides of the housing respectively, the opposed portions of the rod being pivotally attached to inner portions of the body; and
   a paddle connected to and extending rearwardly from the rearward end of the housing;
   wherein the set of motion components are completely encased and located entirely within the flexible waterproof body;
   whereby the apparatus is activated when placed in water and the bait sound is broadcast and the set of motion components imparts motion to the waterproof body when the timer switch is moved from the first state to the second state.

2. The apparatus of claim 1 further comprising:
   an inductance pickup coil connected to the battery;
   a charger including a receptacle and a mating inductance coupling coil adjacent the receptacle;
   whereby the battery is recharged when the apparatus rests in the receptacle and the inductance pickup coil is adjacent the mating inductance coupling coil.

3. The apparatus of claim 2 further comprising:
   a battery protection circuit operatively connected to the battery, a full wave bridge rectifier, and the moisture sensing switch and where the full wave bridge rectifier is further connected to the inductance pickup coil.

4. The apparatus of claim 2 wherein the receptacle and mating inductance coupling coil of the charger further comprises a plurality of receptacles and a plurality of mating inductance coupling coils, each of the plurality of mating inductance coupling coils being adjacent a respective one of the plurality of receptacles.

5. The apparatus of claim 1 wherein the body is shaped to resemble a bait creature selected from the group consisting of a frog, a crayfish, a shad, a hatchling alligator, a cricket, a bream, a shrimp, and a mouse.

6. The apparatus of claim 1 wherein the bait sound stored on the memory chip includes a sound selected from the group consisting of a frog ribbit sound, a crayfish clicking sound, a shad rattling buzzing sound, a hatchling gator squeaking sound, a basspop cricket sound, a small fish sound, a shrimp tail snap sound, and a mouse squeaking sound.

* * * * *